(12) United States Patent
Shi et al.

(10) Patent No.: US 11,759,291 B2
(45) Date of Patent: *Sep. 19, 2023

(54) TOOTH SEGMENTATION BASED ON ANATOMICAL EDGE INFORMATION

(71) Applicant: Align Technology, Inc., San Jose, CA (US)

(72) Inventors: Chao Shi, Morrisville, NC (US); Yingjie Li, Cary, NC (US); Vladislav Andreevich Miryaha, Engels (RU); Boris Aleksandrovich Vysokanov, Moscow (RU); Andrey Bushev, Morrisville, NC (US)

(73) Assignee: Align Technology, Inc., San Jose, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 17/334,599

(22) Filed: May 28, 2021

(65) Prior Publication Data

US 2021/0282898 A1    Sep. 16, 2021

Related U.S. Application Data

(63) Continuation of application No. 16/418,879, filed on May 21, 2019, now Pat. No. 11,020,206.

(60) Provisional application No. 62/674,964, filed on May 22, 2018.

(51) Int. Cl.
| | | |
|---|---|---|
| A61C 7/00 | (2006.01) | |
| A61C 9/00 | (2006.01) | |
| A61C 13/00 | (2006.01) | |

(52) U.S. Cl.
CPC ............ *A61C 7/002* (2013.01); *A61C 9/0046* (2013.01); *A61C 13/0004* (2013.01); *A61C 2007/004* (2013.01)

(58) Field of Classification Search
CPC ... A61C 7/002; A61C 9/0046; A61C 13/0004; A61C 2007/004; A61C 7/08; G06T 2207/30036; G06T 7/12; G06T 7/181; G06V 20/64; G06V 40/171
See application file for complete search history.

(56) References Cited

U.S. PATENT DOCUMENTS

| | | | |
|---|---|---|---|
| 6,227,850 B1 | 5/2001 | Chishti et al. | |
| 6,227,851 B1 | 5/2001 | Chishti et al. | |
| 6,299,440 B1 | 10/2001 | Phan et al. | |
| 6,318,994 B1 | 11/2001 | Chishti et al. | |
| 6,371,761 B1 | 4/2002 | Cheang et al. | |
| 6,386,878 B1 | 5/2002 | Pavlovskaia et al. | |
| 6,406,292 B1 | 6/2002 | Chishti et al. | |
| 6,409,504 B1 | 6/2002 | Jones et al. | |

(Continued)

*Primary Examiner* — Brandon J Miller
(74) *Attorney, Agent, or Firm* — Shay Glenn LLP

(57) ABSTRACT

Provided herein are orthodontic systems and methods for automatically segmenting a person's teeth. Systems, methods and processes are provided to properly segment the teeth of a person's teeth from an image of the person's face showing at least some of the person's teeth (e.g., dental arch). Methods and systems are provided to automatically detect dental edges after a dental scan. Also described herein are methods and systems for generating a simulated image of the person's face from the final segmentation of the person's teeth in which the segmented teeth have been moved from their original position, including a new position based on an orthodontic treatment plan.

20 Claims, 17 Drawing Sheets

(56) References Cited

U.S. PATENT DOCUMENTS

| | | |
|---|---|---|
| 6,457,972 B1 | 10/2002 | Chishti et al. |
| 6,488,499 B1 | 12/2002 | Miller |
| 6,514,074 B1 | 2/2003 | Chishti et al. |
| 6,554,611 B2 | 4/2003 | Chishti et al. |
| 6,582,229 B1 | 6/2003 | Miller et al. |
| 6,602,070 B2 | 8/2003 | Miller et al. |
| 6,621,491 B1 | 9/2003 | Baumrind et al. |
| 6,688,886 B2 | 2/2004 | Hughes et al. |
| 6,726,478 B1 | 4/2004 | Isiderio et al. |
| 6,729,876 B2 | 5/2004 | Chishti et al. |
| 6,739,869 B1 | 5/2004 | Taub et al. |
| 6,767,208 B2 | 7/2004 | Kaza |
| 6,783,360 B2 | 8/2004 | Chishti |
| 7,040,896 B2 | 5/2006 | Pavlovskaia et al. |
| 7,063,532 B1 | 6/2006 | Jones et al. |
| 7,074,038 B1 | 7/2006 | Miller |
| 7,074,039 B2 | 7/2006 | Kopelman et al. |
| 7,077,647 B2 | 7/2006 | Choi et al. |
| 7,108,508 B2 | 9/2006 | Hedge et al. |
| 7,134,874 B2 | 11/2006 | Chishti et al. |
| 7,156,661 B2 | 1/2007 | Choi et al. |
| 7,160,107 B2 | 1/2007 | Kopelman et al. |
| 7,241,142 B2 | 7/2007 | Abolfathi et al. |
| 7,293,988 B2 | 11/2007 | Wen |
| 7,309,230 B2 | 12/2007 | Wen |
| 7,357,634 B2 | 4/2008 | Knopp |
| 7,555,403 B2 | 6/2009 | Kopelman et al. |
| 7,637,740 B2 | 12/2009 | Knopp |
| 7,689,398 B2 | 3/2010 | Cheng et al. |
| 7,736,147 B2 | 6/2010 | Kaza et al. |
| 7,746,339 B2 | 6/2010 | Matov et al. |
| 7,844,356 B2 | 11/2010 | Matov et al. |
| 7,844,429 B2 | 11/2010 | Matov et al. |
| 7,865,259 B2 | 1/2011 | Kuo et al. |
| 7,878,804 B2 | 2/2011 | Korytov et al. |
| 7,880,751 B2 | 2/2011 | Kuo et al. |
| 7,904,308 B2 | 3/2011 | Arnone et al. |
| 7,930,189 B2 | 4/2011 | Kuo |
| 7,942,672 B2 | 5/2011 | Kuo |
| 7,970,627 B2 | 6/2011 | Kuo et al. |
| 7,970,628 B2 | 6/2011 | Kuo et al. |
| 8,038,444 B2 | 10/2011 | Kitching et al. |
| 8,044,954 B2 | 10/2011 | Kitching et al. |
| 8,075,306 B2 | 12/2011 | Kitching et al. |
| 8,092,215 B2 | 1/2012 | Stone-Collonge et al. |
| 8,099,268 B2 | 1/2012 | Kitching et al. |
| 8,108,189 B2 | 1/2012 | Chelnokov et al. |
| 8,126,726 B2 | 2/2012 | Matov et al. |
| 8,260,591 B2 | 9/2012 | Kass et al. |
| 8,275,180 B2 | 9/2012 | Kuo |
| 8,401,826 B2 | 3/2013 | Cheng et al. |
| 8,439,672 B2 | 5/2013 | Matov et al. |
| 8,562,338 B2 | 10/2013 | Kitching et al. |
| 8,591,225 B2 | 11/2013 | Wu et al. |
| 8,788,285 B2 | 7/2014 | Kuo |
| 8,843,381 B2 | 9/2014 | Kuo et al. |
| 8,874,452 B2 | 10/2014 | Kuo |
| 8,896,592 B2 | 11/2014 | Boltunov et al. |
| 8,930,219 B2 | 1/2015 | Trosien et al. |
| 9,037,439 B2 | 5/2015 | Kuo et al. |
| 9,060,829 B2 | 6/2015 | Sterental et al. |
| 9,125,709 B2 | 9/2015 | Matty |
| 9,211,166 B2 | 12/2015 | Kuo et al. |
| 9,220,580 B2 | 12/2015 | Borovinskih et al. |
| 9,364,296 B2 | 6/2016 | Kuo |
| 9,375,300 B2 | 6/2016 | Matov et al. |
| 9,414,897 B2 | 8/2016 | Wu et al. |
| 9,492,245 B2 | 11/2016 | Sherwood et al. |
| 9,642,678 B2 | 5/2017 | Kuo |
| 10,248,883 B2 | 4/2019 | Borovinskih et al. |
| 10,342,638 B2 | 7/2019 | Kitching et al. |
| 10,463,452 B2 | 11/2019 | Matov et al. |
| 10,595,966 B2 | 3/2020 | Carrier, Jr. et al. |
| 10,617,489 B2 | 4/2020 | Grove et al. |
| 10,722,328 B2 | 7/2020 | Velazquez et al. |
| 10,758,322 B2 | 9/2020 | Pokotilov et al. |
| 10,779,718 B2 | 9/2020 | Meyer et al. |
| 10,792,127 B2 | 10/2020 | Kopelman et al. |
| 10,828,130 B2 | 11/2020 | Pokotilov et al. |
| 10,835,349 B2 | 11/2020 | Cramer et al. |
| 10,973,611 B2 | 4/2021 | Pokotilov et al. |
| 10,996,813 B2 | 5/2021 | Makarenkova et al. |
| 10,997,727 B2 | 5/2021 | Xue et al. |
| 11,020,205 B2 | 6/2021 | Li et al. |
| 11,020,206 B2 * | 6/2021 | Shi ........................ A61C 7/002 |
| 11,026,766 B2 | 6/2021 | Chekh et al. |
| 11,033,359 B2 | 6/2021 | Velazquez et al. |
| 11,071,608 B2 | 7/2021 | Derakhshan et al. |
| 11,096,763 B2 | 8/2021 | Akopov et al. |
| 11,116,605 B2 | 9/2021 | Nyukhtikov et al. |
| 11,147,652 B2 | 10/2021 | Mason et al. |
| 11,151,753 B2 | 10/2021 | Gao et al. |
| 2003/0008259 A1 | 1/2003 | Kuo et al. |
| 2003/0143509 A1 | 7/2003 | Kopelman et al. |
| 2003/0207227 A1 | 11/2003 | Abolfathi |
| 2004/0137400 A1 | 7/2004 | Chishti et al. |
| 2004/0152036 A1 | 8/2004 | Abolfathi |
| 2004/0197728 A1 | 10/2004 | Abolfathi et al. |
| 2004/0259049 A1 | 12/2004 | Kopelman et al. |
| 2005/0182654 A1 | 8/2005 | Abolfathi et al. |
| 2005/0244791 A1 | 11/2005 | Davis et al. |
| 2006/0127836 A1 | 6/2006 | Wen |
| 2006/0127852 A1 | 6/2006 | Wen |
| 2006/0127854 A1 | 6/2006 | Wen |
| 2006/0275731 A1 | 12/2006 | Wen et al. |
| 2006/0275736 A1 | 12/2006 | Wen et al. |
| 2008/0306724 A1 | 12/2008 | Kitching et al. |
| 2010/0009308 A1 | 1/2010 | Wen et al. |
| 2010/0068672 A1 | 3/2010 | Arjomand et al. |
| 2010/0068676 A1 | 3/2010 | Mason et al. |
| 2010/0092907 A1 | 4/2010 | Knopp |
| 2010/0167243 A1 | 7/2010 | Spiridonov et al. |
| 2013/0204599 A1 | 8/2013 | Matov et al. |
| 2013/0218530 A1 * | 8/2013 | Deichmann ........ A61C 13/0004 703/1 |
| 2016/0242870 A1 | 8/2016 | Matov et al. |
| 2016/0310235 A1 | 10/2016 | Derakhshan et al. |
| 2017/0076443 A1 * | 3/2017 | Ye ........................ A61B 5/4547 |
| 2017/0273760 A1 | 9/2017 | Morton et al. |
| 2018/0125610 A1 * | 5/2018 | Carrier, Jr. .............. A61C 19/04 |
| 2018/0280118 A1 | 10/2018 | Cramer |
| 2018/0336683 A1 * | 11/2018 | Feng ...................... G06V 10/82 |
| 2019/0029784 A1 | 1/2019 | Moalem et al. |
| 2019/0053876 A1 | 2/2019 | Sterental et al. |
| 2019/0167115 A1 * | 6/2019 | Dorodvand .......... A61B 5/0088 |
| 2019/0192259 A1 | 6/2019 | Kopelman et al. |
| 2019/0328487 A1 | 10/2019 | Levin et al. |
| 2019/0328488 A1 | 10/2019 | Levin et al. |
| 2019/0333622 A1 | 10/2019 | Levin et al. |
| 2019/0343601 A1 | 11/2019 | Roschin et al. |
| 2020/0000552 A1 | 1/2020 | Mednikov et al. |
| 2020/0000554 A1 | 1/2020 | Makarenkova et al. |
| 2020/0000555 A1 | 1/2020 | Yuryev et al. |
| 2020/0085546 A1 | 3/2020 | Li et al. |
| 2020/0107915 A1 | 4/2020 | Roschin et al. |
| 2020/0155274 A1 | 5/2020 | Pimenov et al. |
| 2020/0214800 A1 | 7/2020 | Matov et al. |
| 2020/0297458 A1 | 9/2020 | Roschin et al. |
| 2020/0306011 A1 | 10/2020 | Chekhonin et al. |
| 2020/0306012 A1 | 10/2020 | Roschin et al. |
| 2020/0315744 A1 | 10/2020 | Cramer |
| 2020/0360109 A1 | 11/2020 | Gao et al. |
| 2021/0073998 A1 | 3/2021 | Brown et al. |
| 2021/0134436 A1 | 5/2021 | Meyer et al. |
| 2021/0174477 A1 | 6/2021 | Shi et al. |

* cited by examiner

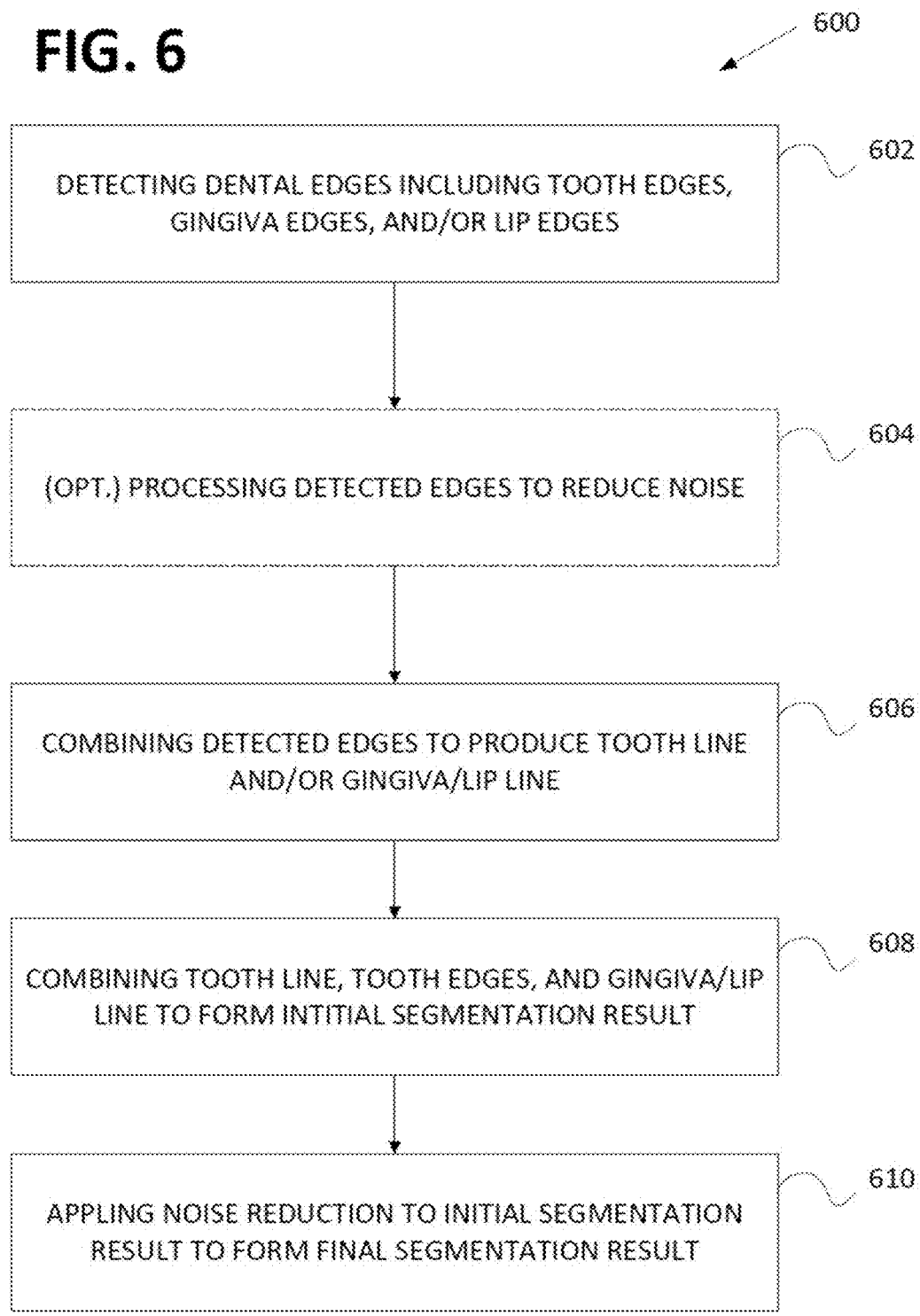

TOOTH SEGMENTATION BASED ON ANATOMICAL EDGE INFORMATION

CLAIM OF PRIORITY

This patent application is a continuation of U.S. patent application Ser. No. 16/418,879, filed May 21, 2019, titled "TOOTH SEGMENTATION BASED ON ANATOMICAL EDGE INFORMATION," now U.S. Pat. No. 11,020,206, which claims priority to U.S. Provisional Patent Application No. 62/674,964, titled "TOOTH SEGMENTATION BASED ON LIP, GINGIVA AND TOOTH EDGE INFORMATION," filed on May 22, 2018, each of which is herein incorporated by reference in its entirety.

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

The boundaries of a person's teeth can be difficult to automatically identify using dental computing technologies without human intervention. Segmentation of an image (or images) of a person's teeth may be useful for accurate modeling and simulation of the person's teeth, and may help to visualize teeth arrangements and/or simulate treatment outcomes.

It may be particularly difficult to identify the boundaries between individual teeth from 2D images which include only a portion of a person's teeth. For instance, 2D images may partially or completely obscure a person's teeth by the person's lips. As another example, teeth crowding problems, e.g., in which adjacent teeth are misaligned, may also make it difficult to determine the interstices between teeth. Variations in tooth shapes also make outlining tooth contours difficult. Additionally, the gingiva/lip/tooth interface in some persons can obscure or obstruct portions of some or all teeth, adding to the difficulty of automatic segmentation.

SUMMARY OF THE DISCLOSURE

Various implementations address one or more needs to accurately simulate treatment outcomes and/or visualize identify teeth, gingiva, and lips in computer models to accurately segment individual teeth from a two-dimensional image and/or scan of a person's face which includes the person's smile (e.g., lips and teeth). The methods and apparatuses (e.g., systems, devices, etc.) described herein may provide for accurate and/or rapid automatic segmentation of a person's teeth from a two-dimensional (2D) image of the person's face in which at least some of the patent's teeth (e.g., four, five, six, seven, eight, nine, ten, etc.) are at least partially visible for either the top arch, the bottom arch, or both the top and bottom arch.

The methods and apparatuses described herein may use the segmented teeth to generate a simulated image of the person's face in which the segmented teeth are moved from their original position in order to model (e.g., simulate) the effect of an orthodontic treatment plan. Multiple simulations may be generated. Based on these one or more simulations, the person and/or a dental professional may select and/or modify an orthodontic treatment plan. An orthodontic treatment plan may include, for example, the use of a series of dental aligners for moving the person's teeth.

For example, an orthodontic treatment method may include: receiving, in a processor, an image of a person's face including at least a portion the person's dental arch; automatically detecting tooth edges, gingiva edges, and lip edges from the image; generating, from the tooth edges, gingiva edges and lip edges, a gingiva/lip line, a tooth line and a tooth-tooth edges; forming, in the processor, an initial segmentation of the person's teeth from the tooth line, the tooth-tooth edges, and gingiva/lip line; and processing, in the processor, the initial segmentation of the person's teeth to form a final segmentation of the person's teeth.

Any appropriate technique may be used to detect the edges of the lips, gingiva and/or teeth from the two-dimensional image of the person's teeth. For example, one or more machine learning techniques may be used to detect the edges of the person's lips, gingiva and/or teeth from the image. Machine-learning edge detection may include, but is not limited to Holistically-Nested Edge Detection (HED). Any machine-learning edge detector(s) providing lip, gingiva and tooth edges may be used with the segmentation methods and apparatuses described herein. The methods and apparatuses described herein may be fully automatic, without requiring human intervention, and/or semi-automatic, with some human intervention.

In any of the methods described herein, the method may also include applying noise reduction to the detected tooth edges, gingiva edges, and lip edges. For example, the noise reduction may include (but is not limited to) one or more of: determining local maximum, thinning, or shortest path algorithm(s). The processing step may further include applying noise reduction to the initial segmentation result.

The step of generating the gingiva/lip line, the tooth line and the tooth-tooth edges may include: forming the gingiva/lip line from the gingiva edges and lip edges; forming the tooth line from the tooth edges and lip edges; and/or forming the tooth-tooth edges from the tooth line, the gingiva/lip line and the tooth edges.

In any of these methods, processing the initial segmentation of the person's teeth to form the final segmentation of the person's teeth may include applying region growing to at least one closed region of the initial segmentation result. Closed regions smaller than a region threshold may be removed from the initial segmentation result.

As mentioned, any of these methods may also include generating, transmitting and/or displaying (e.g., presenting) a simulated image of the person's face from the final segmentation of the person's teeth and a treatment plan for moving the person's teeth. For example, the simulated image may be generated from the image of the person's face in which the region of interest, e.g., the person's mouth between the lip line(s), is modified by moving the segmented teeth to simulate the effect of an orthodontic treatment plan. The orthodontic treatment plan may be simulated from a person-specific treatment plan that has been calculated based on the person's own dentition, or it may be simulated from a generic template (e.g., predicted tooth movements based on population data, or based on prior, similar persons, or the like).

In some variations, these methods may include allowing the person to select among a plurality of simulated images in order to select or modify an orthodontic treatment plan. In some variations, these methods may include selecting a treatment plan and/or generating a series of orthodontic appliances from a treatment plan.

The methods and apparatuses (e.g., systems) described herein may be used to simulate static (e.g., still, single-frame) two-dimensional images using the edge detection methods described herein and/or they may be used to generate animations (e.g., videos). Any of these method and apparatuses may include displaying simulated person's smile. In some variation, the methods and apparatuses described herein may be used to for tracking (e.g., progress tracking) during an orthodontic treatment. In some variations, the methods and apparatuses may be used to assess orthodontic appliance (e.g., aligner) fit.

For example, an orthodontic treatment method may include: receiving, in a processor, an image of a person's face including at least a portion the person's dental arch; automatically detecting tooth edges, gingiva edges, and lip edges from the image; combining, in the processor the gingiva edges and lip edges to form a gingiva/lip line; combining, in the processor the tooth edges and lip edges to form a tooth line; combining, in the processor the tooth line, the gingiva/lip line and the tooth edges to form a tooth-tooth edges; forming, in the processor, an initial segmentation of the person's teeth from the tooth line, the tooth-tooth edges, and gingiva/lip line; processing, in the processor, the initial segmentation of the person's teeth to form a final segmentation of the person's teeth; and presenting a simulated image of the person's face from the final segmentation of the person's teeth and a treatment plan for moving the person's teeth.

Also described herein are systems, e.g., dental treatment systems, including systems for generating, storing, transmitting, and/or displaying a simulation of a person's face including the person's teeth based on automatic segmentation of the person's teeth from a two-dimensional image of the person's face. For example, a system may include: one or more processors; and one or more storage media coupled to the one or more processors and storing instructions that, when executed by the one or more processors, performs a computer-implemented method comprising: receiving, in the one or more processors, an image of a person's face including at least a portion the person's dental arch; automatically detecting tooth edges, gingiva edges, and lip edges from the image; generating, from the tooth edges, gingiva edges and lip edges, a gingiva/lip line, a tooth line and a tooth-tooth edges; forming, in the processor, an initial segmentation of the person's teeth from the tooth line, the tooth-tooth edges, and gingiva/lip line; and processing, in the processor, the initial segmentation of the person's teeth to form a final segmentation of the person's teeth.

The instructions may be configured to perform the computer-implemented method further comprising applying noise reduction to the detected tooth edges, gingiva edges, and lip edges. For example, the noise reduction may comprise a local maximum, thinning, and/or shortest path algorithm. The instructions may be configured to perform the computer-implemented method further comprising applying noise reduction to the initial segmentation result.

The instructions may be configured to perform the computer-implemented method further comprising applying region growing to at least one closed region of the initial segmentation result. The instructions may be configured to perform the computer-implemented method further comprising removing closed regions smaller than a region threshold from the initial segmentation result.

Generating may include: forming the gingiva/lip line from the gingiva edges and lip edges; forming the tooth line from the tooth edges and lip edges; and/or forming the tooth-tooth edges from the tooth line, the gingiva/lip line and the tooth edges.

The instructions may be configured to present a simulated image of the person's face from the final segmentation of the person's teeth and a treatment plan for moving the person's teeth. Presenting may include transmitting and/or displaying (e.g., displaying to the person and/or dental professional) the simulated image.

For example a system may include: one or more processors; and one or more storage media coupled to the one or more processors and storing instructions that, when executed by the one or more processors, performs a computer-implemented method comprising: receiving, in a processor, an image of a person's face including at least a portion the person's dental arch; automatically detecting tooth edges, gingiva edges, and lip edges from the image; combining, in the processor the gingiva edges and lip edges to form a gingiva/lip line; combining, in the processor the tooth edges and lip edges to form a tooth line; combining, in the processor the tooth line, the gingiva/lip line and the tooth edges to form a tooth-tooth edges; forming, in the processor, an initial segmentation of the person's teeth from the tooth line, the tooth-tooth edges, and gingiva/lip line; processing, in the processor, the initial segmentation of the person's teeth to form a final segmentation of the person's teeth; and presenting a simulated image of the person's face from the final segmentation of the person's teeth and a treatment plan for moving the person's teeth.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 6 is a flowchart describing an example of a process for segmenting a person's teeth.

DETAILED DESCRIPTION

Figure 1A:
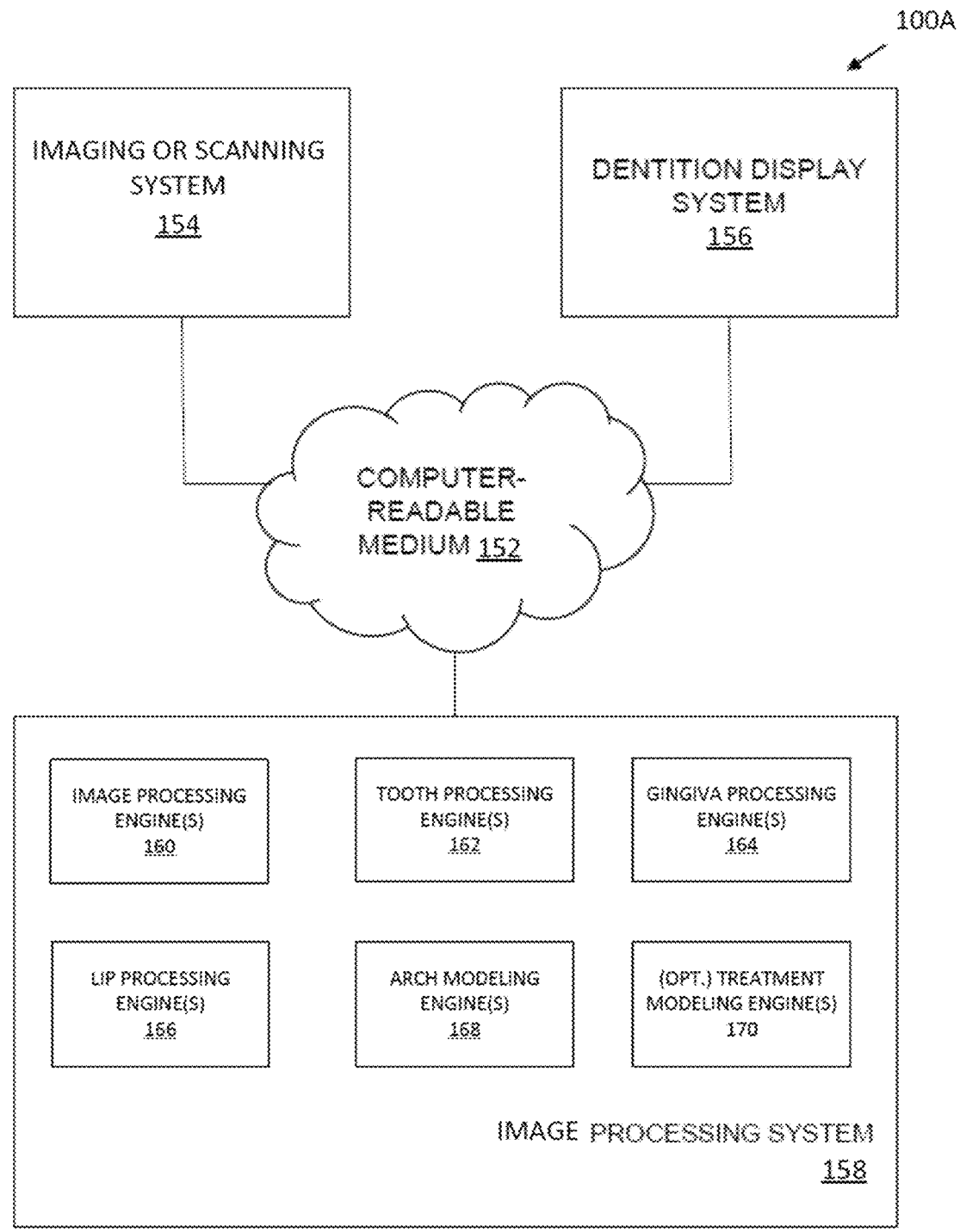
FIG. 1A is a diagram showing an example of a computing environment configured to digitally capture two-dimensional (2D) representations of a dental arch.

The present disclosure is related to systems, methods, computing device readable media, and devices for performing automated tooth segmentation (e.g., for dental, orthodontic, etc. applications) using anatomical features detected in images of people. The systems, methods, and computing devices herein may solve technical problems related to design and segmentation of images and/or models of a person's teeth.

People may wish to visualize the outcome of dental treatment such as orthodontic treatment (treatment for malocclusions of teeth, jaws, etc.), restorative treatment (treatment involving implants, restoring teeth, etc.) before committing to it. The tools provided herein enable people to visualize the effects of dental treatment on the arrangement of their teeth and/or visible parts of their smile. The segmentation approaches described herein allow individuals to visualize how a dental treatment plan would affect a representation of their face (e.g., image taken through a mobile phone camera, image taken through a computer camera, image taken from a social media image, etc.).

As noted herein, a person (e.g., a putative patient, patient, etc. of a dental treatment plan) may provide a two-dimensional (2D) representation of their face that shows visible parts of their teeth and/or soft tissue, such as their lips and gums/gingiva. The edge detection tools described herein may detect anatomical edges that define parts of the teeth relative to the soft tissue and/or tooth edges of individual teeth relative to each other. The anatomical edges may be used to generate various landmarks that define the boundaries of a set of teeth (such as the visible teeth in a single jaw of a person). Examples of landmarks include a soft tissue line that separates lips from gums/gingiva, and a tooth line that defines the visible edges of the set of teeth. The visible edge of the teeth may include incisal edges of anterior teeth, occlusal edges of posterior teeth, and/or any edges of teeth that are farthest from the roots of those teeth.

The landmarks may be used to form a segmented tooth model of the set of teeth. A "segmented tooth model," as used herein, may a virtual representation of teeth partitioned into tooth segments, e.g., representations of individual teeth of a set of teeth. A segmented tooth model may have teeth partitioned by anatomical number/anatomical identifier, location, shape, etc. The tooth segments herein may, in some implementations, represent the visible teeth in the 2D representation provided by a person.

The methods and apparatuses described herein may be useful in planning and fabrication of dental appliances, including elastic polymeric positioning appliances, is described in detail in U.S. Pat. No. 5,975,893, and in published PCT application WO 98/58596, which is herein incorporated by reference for all purposes. Systems of dental appliances employing technology described in U.S. Pat. No. 5,975,893 are commercially available from Align Technology, Inc., San Jose, Calif., under the tradename, Invisalign System.

Throughout the body of the Description of Embodiments, the use of the terms "orthodontic aligner", "aligner", or "dental aligner" is synonymous with the use of the terms "appliance" and "dental appliance" in terms of dental applications. For purposes of clarity, embodiments are hereinafter described within the context of the use and application of appliances, and more specifically "dental appliances."

The methods and apparatuses (e.g., systems, devices, etc.) described below can be used with and/or integrated into a dental treatment plan (e.g., an orthodontic treatment plan, a restorative treatment plan, etc.). The methods and apparatuses described herein may be used to segment teeth, e.g., provide a segmented tooth model of teeth from a two-dimensional image and segmentation information from a segmented tooth model may be used to simulate, modify and/or choose between various dental treatment plans.

Segmenting the person's teeth can be done through automated agents (e.g., using a computing device). For example, segmentation can be performed by a computing system by evaluating data (such as a two-dimensional photo, a scan, and/or a representation of a dental impression) of the person's teeth or arch.

As described herein, a two-dimensional image can be taken of a person's teeth with an image capture device (camera, e.g., camera on a mobile phone, computer, etc.). The person can be positioned in front of the camera and asked to smile to allow the image to capture the natural smile of the patient, including the visible teeth, gingiva, and lips of the patient. Multiple images of the person's teeth can be taken to ensure the smile and teeth of the person are captured and in focus. In general, it is desirable for the image(s) to capture at least 6 of the patient's teeth from edge to edge of the lips. After capturing the image(s), the image(s) can be preprocessed by the computing device to find the midline of the person's teeth and rotate the image until the midline is vertical.

In other embodiments, an intraoral scanner may image a person's dental arch and generate a virtual three-dimensional model of that dental arch. During an intraoral scan procedure (also referred to as a scan session), a user (e.g., a dental practitioner) of an intraoral scanner may generate multiple different images (also referred to as scans or medical images) of a dental site, model of a dental site, or other object. The images may be discrete images (e.g., point-and-shoot images) or frames from a video (e.g., a continuous scan). The images can be preprocessed by the computing device as described above to find the midline and rotate the images until the midline is vertical.

An automated tooth segmentation system, as used herein, may include a system that uses automated agents to identify and/or number individual teeth and/or dental features of virtual representations of teeth, such as teeth represented in a two-dimensional photographic image or a 3D dental mesh model resulting from a digital scan.

The present disclosure presents one or more novel processes for identifying and segmenting a person's teeth during a segmentation process. Some implementations herein may solve technical problems related to optimizing and/or increasing the accuracy of digital dental scanning technologies. The tooth segmentation processes described herein advantageously may: 1) Provide fully automatic segmentation with no human intervention needed; 2) Compensate for errors generated by machine learning edge detectors; 3) Quickly and efficiently segment teeth; and 4) Implement any machine learning edge detectors providing lip, gingiva, and tooth edges.

FIG. 1A is a diagram showing an example of a computing environment 100A configured to digitally capture two-dimensional (2D) representations of a dental arch. The computing environment 100A includes a computer-readable medium 152, an imaging or scanning system 154, a dentition display system 156, and an image processing system 158.

One or more of the modules in the computing environment 100A may be coupled to one another or to modules not explicitly shown.

The computer-readable medium 152 and other computer readable media discussed herein are intended to represent a variety of potentially applicable technologies. For example, the computer-readable medium 152 can be used to form a network or part of a network. Where two components are co-located on a device, the computer-readable medium 152 can include a bus or other data conduit or plane. Where a first component is co-located on one device and a second component is located on a different device, the computer-readable medium 152 can include a wireless or wired back-end network or LAN. The computer-readable medium 152 can also encompass a relevant portion of a WAN or other network, if applicable.

The imaging or scanning system 154 may include a computer system configured to capture still images, video, and/or other media of a person's dental arch. The imaging or scanning system 154 may include memory, one or more processors, and sensors to detect contours on a person's dental arch. The imaging or scanning system 154 may include a system configured to provide a virtual representation of a mold of person's (e.g., a putative patient, a patient, etc.) dental arch. A "dental arch," as used herein, may include at least a portion of a person's dentition formed by the person's maxillary and/or mandibular teeth, when viewed from an occlusal perspective. A dental arch may include one or more maxillary or mandibular teeth of a person, such as all teeth on the maxilla or mandible or a person. The imaging or scanning system 154 may be used as part of a dental treatment plan. In some implementations, the imaging or scanning system 154 is configured to capture a 2D representation of a person who is evaluating whether or not to undergo dental treatment.

In some implementations, the imaging or scanning system 154 is configured to capture a putative patient's dental arch at a beginning stage, an intermediate stage, etc. of a dental treatment plan. The imaging or scanning system 154 may include a device configured to obtain an image, such as an image of a person seeking dental treatment. The image capture system may comprise any type of mobile device (iOS devices, iPhones, iPads, iPods, etc., Android devices, portable devices, tablets), PCs, cameras (DSLR cameras, film cameras, video cameras, still cameras, etc.). In some implementations, the imaging or scanning system 154 comprises a set of stored images, such as images stored on a storage device, a network location, a social media website, etc. In some implementations, the imaging or scanning system 154 includes a computer system configured to capture one or more scans of a person's dentition. The imaging or scanning system 154 may be configured to capture 2D images (e.g., images of a face, teeth, jaw, etc.) of a person. The images may include x-rays or other subsurface images, and/or 3D data representing the person's teeth, face, gingiva, or other aspects of a person. The imaging or scanning system 154 may also include a 2D imaging system, such as a still or video camera, an x-ray machine, or other 2D imager. In some embodiments, the imaging or scanning system 154 also includes a 3D imager, such as an intraoral scanner or an impression scanner.

The dentition display system 156 may include a computer system configured to display at least a portion of a dentition of a person. The dentition display system 156 may include memory, one or more processors, and a display device to display the person's dentition. The dentition display system 156 may be implemented as part of a computer system, a display of a dedicated intraoral scanner, etc. In some implementations, the dentition display system 156 facilitates display of a person's dentition using scans that are taken at an earlier date and/or at a remote location. It is noted the dentition display system 156 may facilitate display of scans taken contemporaneously and/or locally to it as well. As noted herein, the dentition display system 156 may be configured to display the intended or actual results of a dental treatment plan applied to a dental arch scanned by the scanning system 154. The results may include 3D virtual representations of the dental arch, 2D images or renditions of the dental arch, etc.

The image processing system 158 may include a computer system configured to process images of a person's dentition taken by the imaging or scanning system 154. As noted herein, the image processing system 158 may be configured to process scans of teeth in a dental arch. The image processing system 158 may include image processing engine(s) 160, tooth processing engine(s) 162, gingiva processing engine(s) 164, lip processing engine(s) 166, arch modeling engine(s) 168, and optional treatment modeling engine(s) 170. One or more of the modules of the image processing system 158 may be coupled to each other or to modules not shown.

As used herein, any "engine" may include one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, "datastores" may include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

The image processing engine(s) 160 may implement one or more automated agents configured to interface with the imaging or scanning system 154. The image processing engine(s) 160 may include graphics engines to gather images or scans of a dental arch. In some implementations, the image processing engine(s) 160 format raw data from an image or scan of a dental arch into a 2D or 3D dental mesh model of the dental arch. The 3D dental mesh models may comprise polyhedral objects that depict teeth and/or other elements of the dental arch in a format that can be rendered on the dentition display system 156. The image processing engine(s) 160 may provide 2D or 3D dental mesh models and/or other data to other modules of the scan processing system 158.

The tooth processing engine(s) 162 may implement one or more automated agents configured to identify and/or accommodate dental structures. A "dental structure," as used herein, may include any dental structure (e.g., tooth or combination of teeth) in a dental arch. In some implementations, the tooth processing engine(s) 162 are configured to analyze images or scans of a person's dental arch for a tooth line and/or for tooth edges (e.g., the edges of teeth between adjacent teeth). The tooth processing engine(s) 162 may implement machine learning edge detectors such as holistically nested edge detection to detect and analyze the tooth line and/or tooth edges in the dental arch. Other edge detectors including other types of machine learning edge detectors can also be implemented by the tooth processing engine(s) 162. Additionally or alternatively, the tooth processing engine(s) 162 may communicate with the gingiva processing engine(s) 164 (or gingiva processing engine(s) 164b, in FIG. 1C), the lip processing engine(s) 166 (or lip processing engine(s) 166b, in FIG. 1D), or the arch modeling engine(s) 168 (or arch modeling engine(s) 168b in FIG. 1E). In some examples, the tooth processing engine(s) 162 may combine or process the edges detected by the tooth processing engine(s) 162 with the edges detected by another engine, such as the gingiva processing engine(s) 164 or the lip processing engine(s) 166. For example, the tooth processing engine(s) 162 may combine the teeth edges detected by the tooth processing engine(s) 162 with the lip edges detected by the lip processing engine(s) 166 to compute the tooth line of the person's dental arch. In some examples, the tooth processing engine(s) can use computing or machine learning algorithms such as shortest path algorithms to process the tooth line from the tooth edges and lip edges. A "shortest path technique," as used herein, may include a technique to identify a smooth curve between two points, such as a starting point and an endpoint. An example shortest path technique used to identify inter-tooth edges may involve: identifying a specified tooth of the set of teeth; identifying a starting point common to the specified tooth and the soft tissue line; identifying an ending point common to the specified tooth and the tooth line; defining a local region of interest including the starting point and the ending point; and defining a path from the starting point and the ending point through the local region of interest, the path characterized by a sum of pixel values that are minimized relative to other paths from the starting point to the ending point through the local region of interest.

The Gingiva processing engine(s) may implement one or more automated agents configured to identify and/or accommodate gingiva structures. A "gingiva structure," as used herein, may include any gingiva structure (e.g., the gums or other soft tissue lining the mouth) in a dental arch. In some implementations, the gingiva processing engine(s) 164 are configured to analyze images or scans of a person's dental arch for gingiva edges. The gingiva processing engine(s) 164 may implement machine learning edge detectors such as holistically nested edge detection to detect and analyze the gingiva edges in the dental arch. Other edge detectors including other types of machine learning edge detectors can also be implemented by the tooth processing engine(s) 162. Additionally or alternatively, the gingiva processing engine(s) 164 may communicate with the tooth processing engine(s) 162 (or tooth processing engine(s) 162b, in FIG. 1B), the lip processing engine(s) 166 (or lip processing engine(s) 166b, in FIG. 1D), or the arch modeling engine(s) 168 (or arch modeling engine(s) 168b in FIG. 1E). In some examples, the gingiva processing engine(s) 164 may combine or process the edges detected by the gingiva processing engine(s) 164 with the edges detected by another engine, such as the tooth processing engine(s) 162 or the lip processing engine(s) 166. For example, the gingiva processing engine(s) 164 may combine the gingiva edges detected by the gingiva processing engine(s) 164 with the lip edges detected by the lip processing engine(s) 166 to compute the gingiva/lip line of the person's dental arch. In some examples, the lip processing engine(s) can use computing or machine learning algorithms such as shortest path algorithms to process the gingiva/lip line from the gingiva edges and lip edges.

The lip processing engine(s) 166 may implement one or more automated agents configured to identify and/or accommodate lip structures. A "lip structure," as used herein, may include any lip structure (e.g., the edges of the upper and lower lips) of a person. In some implementations, the lip processing engine(s) 166 are configured to analyze images or scans of a person's dental arch for lip edges. The lip processing engine(s) 166 may implement machine learning edge detectors such as holistically nested edge detection to detect and analyze the tooth line and tooth edges in the dental arch. Other edge detectors including other types of machine learning edge detectors can also be implemented by the lip processing engine(s) 166. Additionally or alternatively, the lip processing engine(s) 166 may communicate with the tooth processing engine(s) 162 (or tooth processing engine(s) 162b, in FIG. 1B), gingiva processing engine(s) 164 (or gingiva processing engine(s) 164b, in FIG. 1C), or the arch modeling engine(s) 168 (or arch modeling engine(s) 168b in FIG. 1E). In some examples, the lip processing engine(s) 166 may combine or process the edges detected by the lip processing engine(s) 166 with the edges detected by another engine, such as the tooth processing engine(s) 162 or the gingiva processing engine(s) 164. For example, the lip processing engine(s) 166 may combine the lip edges detected by the lip processing engine(s) 166 with the gingiva edges detected by the gingiva processing engine(s) 164 to compute the gingiva/lip line of the person's dental arch. In some examples, the lip processing engine(s) can use computing or machine learning algorithms such as shortest path algorithms to process the gingiva/lip line from the gingiva edges and lip edges. Additionally, the lip processing engine(s) 166 may combine the teeth edges detected by the tooth processing engine(s) 162 with the lip edges detected by the lip processing engine(s) 166 to compute the tooth line of the person's dental arch. In some examples, the lip processing engine(s) can use computing or machine learning algorithms such as shortest path algorithms to process the tooth line from the tooth edges and lip edges.

The arch modeling engine(s) 168 may implement one or more automated agents configured to model 2D or 3D dental mesh models into virtual representations of dental arches. In some implementations, the arch modeling engine(s) 168 assign physical and/or geometrical properties to a 2D or 3D dental mesh model that are related to physical/geometrical properties of dental arches. The arch modeling engine(s) 168 may receive edge detection results from the tooth processing engine(s) 162 (e.g., the tooth line and/or tooth edges), the gingiva processing engine(s) 164 (e.g., the gingiva edges and/or gingiva/lip line), and/or the lip processing engine(s) 166 (e.g., the lip edges and/or the gingiva/lip line), and combine selected edge detection results from the engines into an initial segmentation result. For example, the arch modeling engine(s) 168 may receive the gingiva/lip line from the gingiva processing engine(s) 164 or the lip processing engine(s) 166, may receive the tooth edges from the tooth processing engine(s) 162, and may receive the tooth line from the tooth processing engine(s) 162 or the lip processing engine(s) 166.

The arch modeling engine(s) 168 may be further configured to perform image segmentation such as region growing on the initial segmentation result to fill all pixels in the region of interest and remove noise. The arch modeling engine(s) 168 can output the final segmentation result to, for example, the optional treatment modeling engine(s) 170. As an example, the arch modeling engine(s) 168 may also implement one or more automated segmentation agents that assign tooth identifiers (e.g., universal tooth numbers) to specific portions of a 2D or 3D dental mesh model. The arch modeling engine(s) 168 may further evaluate curves and/or other geometric properties of a 2D or 3D dental mesh model to determine whether a scan corresponds to a maxilla, a mandible, or other portion of a person's dentition.

The optional treatment modeling engine(s) 170 may be configured to store dental treatment plans and/or the results of dental treatment plans. The optional treatment modeling engine(s) 170 may provide the results of dental treatment plans on a 2D or 3D dental mesh model. The optional treatment modeling engine(s) 170 may model the results of application of orthodontic force systems and/or appliances, such as aligners to the person's dental arch over the course of an orthodontic treatment plan.

Figure 1B:
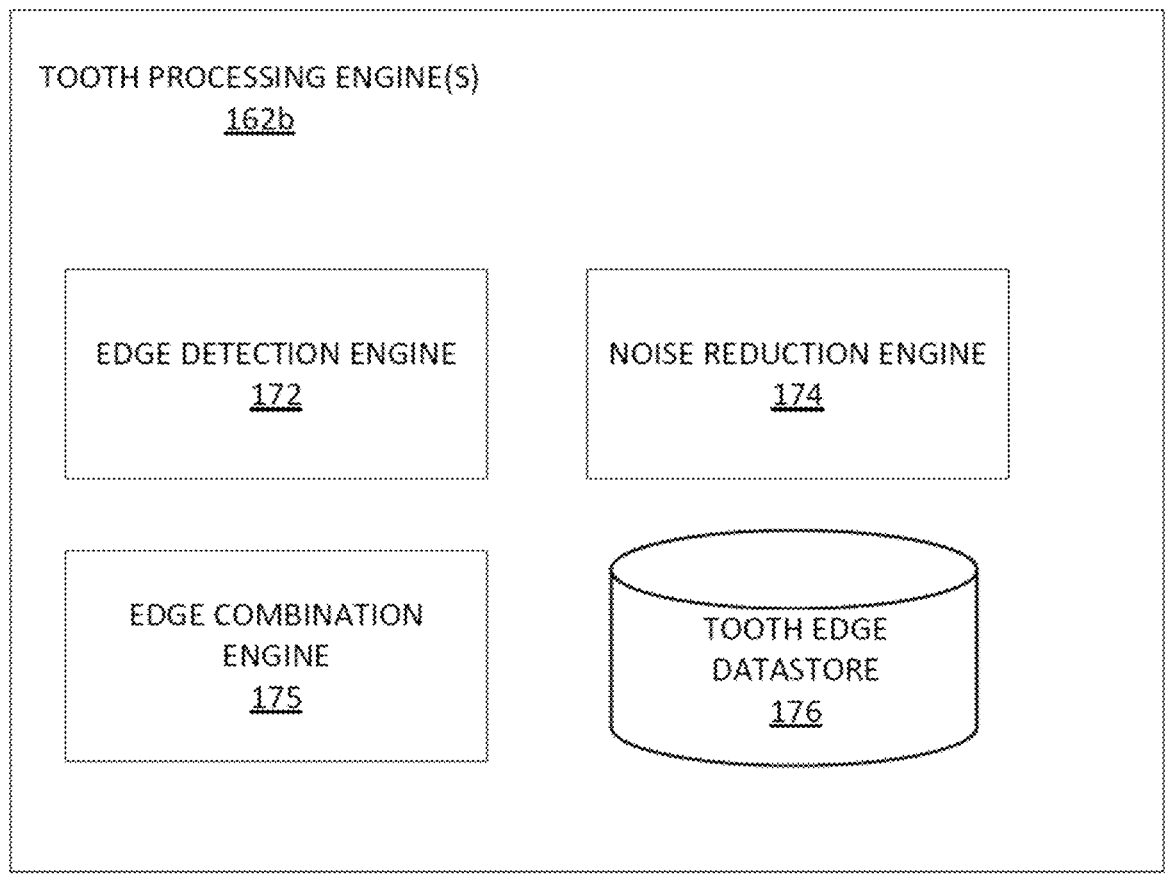
FIG. 1B is a diagram showing an example of a tooth processing engine(s).

FIG. 1B is a diagram showing an example of the tooth processing engine(s) 162b. The tooth processing engine(s) 162b may include an edge detection engine 172, a noise reduction engine 174, an edge combination engine 175, and a tooth edge datastore 176. One or more of the modules of the tooth processing engine(s) 162b may be coupled to each other or to modules not shown.

The edge detection engine 172 may implement one or more automated agents configured to scan a dental arch for segmentation data. "Segmentation data," as used herein, may include positions, geometrical properties (contours, etc.), and/or other data that can form the basis of segmenting a dental arch. The edge detection engine 172 may implement automated agents to detect tooth edges and/or a tooth line in the dental arch. In some implementations, the edge detection engine 172 scans 2D (e.g., a photograph) or 3D (e.g., dental mesh model) data for the segmentation data.

Figure 2A:
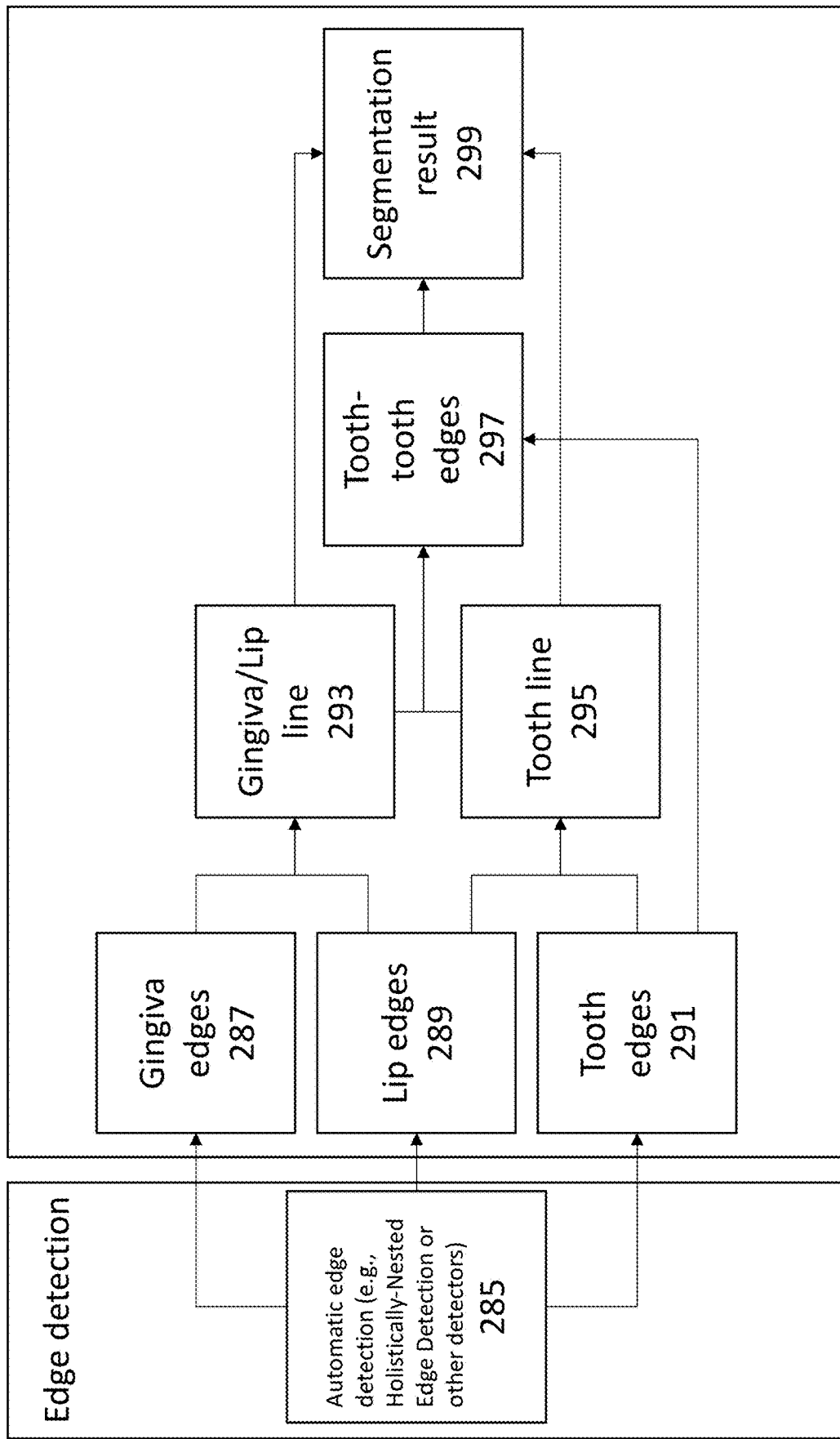
FIG. 2A is an example of process diagram showing the segmentation of a person's teeth from an image of the person's face.

FIG. 2A illustrates an example of a flow (process) diagram for a method of automatically segmenting teeth from an image of a person's face. As mentioned the image may be preprocessed to align it by finding the midline of the person's teeth and rotating the image until the midline is vertical. The image may also be scaled, cropped, filtered, etc. Preprocessing may also confirm that the image is sufficiently sized, focused, or the like. Images that are not sufficiently sized and/or focused may be rejected and a notification provided, or another image selected and/or taken (manually or automatically).

Following preprocessing, the image may be further processed to detect edges: gingival edges, tooth edges and lip edges. In the example shown in FIG. 2A, the edge detection 285 is a machine learning edge detection, such as Holistically-Nested Edge Detection; any other edge-detection (including other machine learning edge detectors) may be used. The resulting detected edges may be derived images showing possible edge regions. These detected edges may be further processed, e.g., to reduce noise, such as by using one or more image processing noise reduction techniques such as identifying a local maximum, thinning, shortest path, etc. As used herein, a "local maximum" technique may involve identifying local regions of interest in a 2D representation and finding local maxima of intensity values within each local region of interest. The intensity values may simply exceed one or more intensity thresholds for the local region of interest. (Though local maxima techniques are described herein, it is noted some implementations may use "local minima," where intensity values within various local regions of interest fall below a specified intensity threshold.)

As shown in FIG. 2A, the gingival edges 287, tooth edges 291 and lip edges 289 may then be used to determine the gingival line 293, the tooth line 295, and the tooth-to-tooth edges 297. For example, the combination of the gingival edges and the lip edges may be used to form the gingival/lip line. Similarly, the combination of the lip edges and tooth edges may be used to form the tooth line. Finally the combination of the derived gingival/lip line and tooth line with the tooth edges may be used to form the tooth-to-tooth edges (lines). The tooth-to-tooth edges as well as the gingival/lip line and tooth line may then be used to determine the segmentation result (e.g., person tooth segmentation result) 299.

Figure 2B:
FIGS. 2B-2F illustrate an example of detecting and processing dental edges including tooth edges.
Figure 2C:
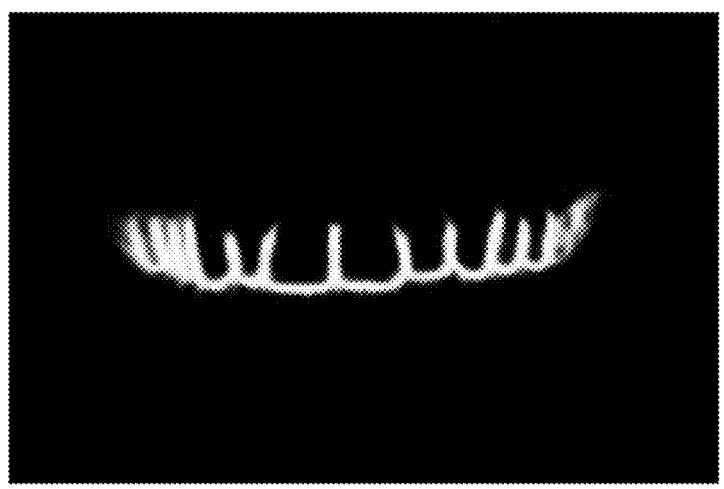

FIG. 2B is an example of a 2D digital photograph 200 of a person's dental arch that may be scanned by the edge detection engine 172. FIG. 2C is an example of tooth edges 202 detected by the edge detection engine 172 from the 2D digital photograph of FIG. 2A.

Figure 2D:
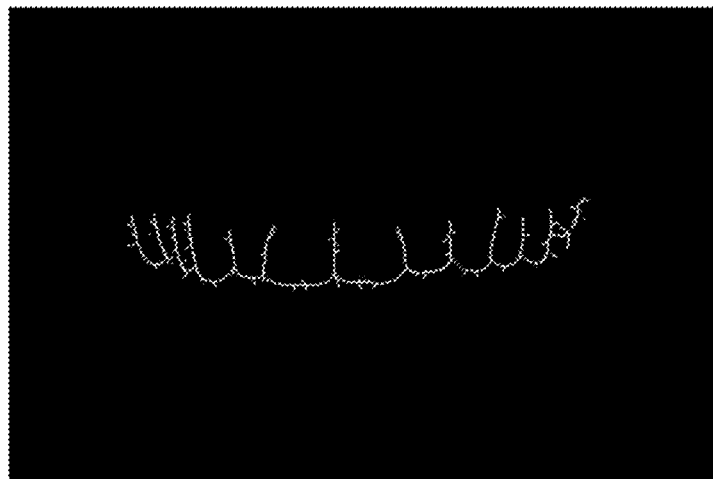

The noise reduction engine 174 may implement one or more automated agents configured to remove noise from or refine the edges detected by the edge detection engine 172. For example, the noise reduction engine 174 may implement a noise reduction algorithm or noise reduction machine learning algorithm to remove noise from or refine the edges detected by the edge detection engine 172. In some examples, the algorithm can be a local maximum algorithm. FIG. 2D is an example of modified tooth edges 204 after applying the noise reduction algorithm with the noise reduction engine 180 to the tooth edges 202 from FIG. 2C.

Figure 2E:
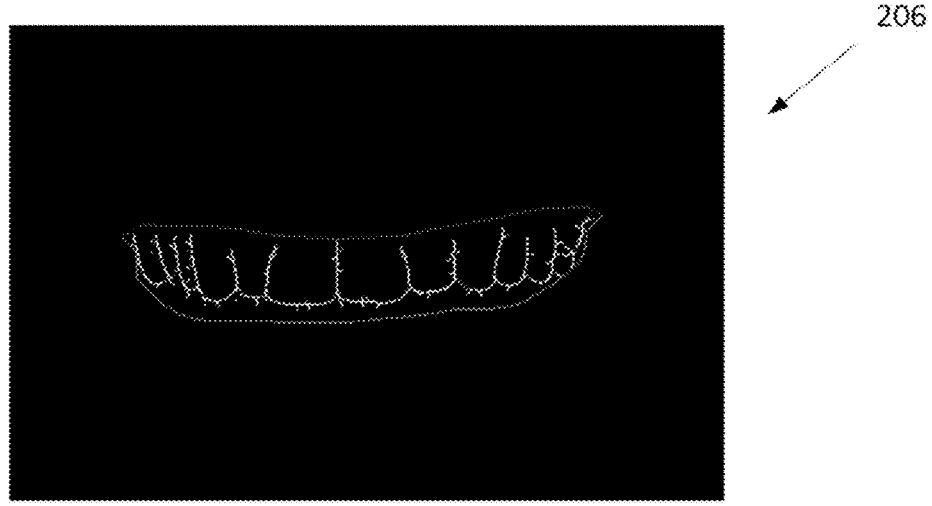
Figure 2F:
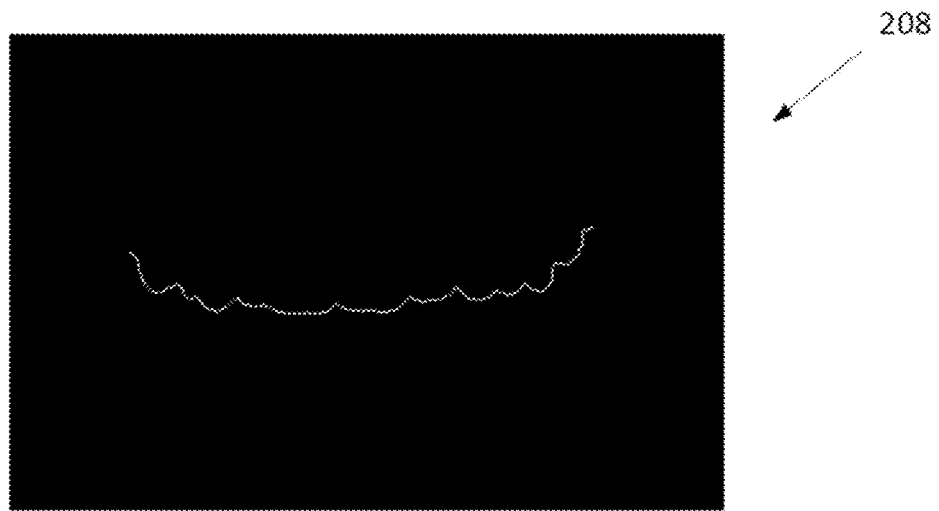

The edge combination engine 175 may implement one or more automated agents configured to combine or overlay edges detected by the edge detection engine 172 with edges detected by one of the other modules, such as the gingiva processing engine(s) 164 or the lip processing engine(s) 166. The edge combination engine 175 may also implement one or more automated agents configured to calculate and output a section or portion of the combined or overlaid edges. For example, the edge combination engine 175 may overlay the tooth edges detected by the tooth processing engine(s) 162 with the lip edges detected by the lip processing engine(s) 166 to form combined tooth and lip edges. The edge combination engine 175 may then implement an algorithm to the combined tooth and lip edges, such as a shortest path algorithm, to calculate or determine a tooth line. FIG. 2E illustrates an example of combined 206 tooth edges 204 and lip edges 404 (described below), comprising the tooth edges detected by the tooth processing engine(s) 162 overlaid with the lip edges detected by the lip processing engine(s) 166. FIG. 2F is an example of tooth line 208 derived from this combination after applying a shortest path algorithm to the combined tooth and lip edges 206 from FIG. 2E.

The tooth edge datastore 176 may be configured to store data related to model dental arches from the edge detection engine 172, the noise reduction engine 174, or the edge combination engine 175. The model dental arch data may comprise tooth edges, tooth lines, combined tooth and lip edges, or other combined or processed edge data from the other modules.

Figure 1C:
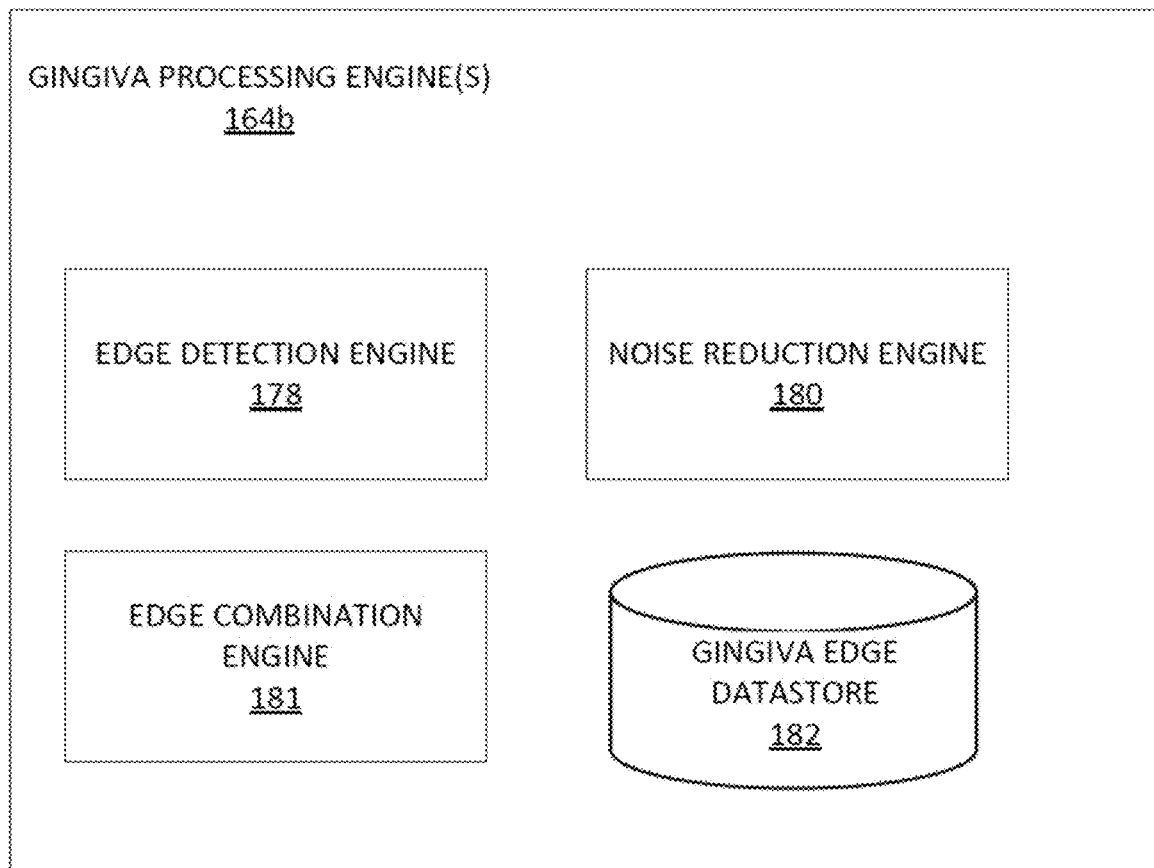
FIG. 1C is a diagram showing an example of a gingiva processing engine(s).

FIG. 1C is a diagram showing an example of the gingiva processing engine(s) 164b. The gingiva processing engine(s) 164b may include an edge detection engine 178, a noise reduction engine 180, an edge combination engine 181, and a gingiva edge datastore 182. One or more of the modules of the tooth processing engine(s) 162b may be coupled to each other or to modules not shown.

Figure 3A:
FIGS. 3A-3E illustrate an example of detecting and processing dental edges including gingiva edges.
Figure 3B:

The edge detection engine 178 may implement one or more automated agents configured to scan a dental arch for segmentation data. The edge detection engine 178 may implement automated agents to detect gingiva edges in the dental arch. In some implementations, the edge detection engine 178 scans 2D (e.g., a photograph) or 3D (e.g., dental mesh model) data for the segmentation data. FIG. 3A is an example of a 2D digital photograph 300 of a person's dental arch that may be scanned by the edge detection engine 178 (the same image is used for FIGS. 2B, 3A and 4A, corresponding to tooth edge detection, gingiva edge detection and lip edge detection, respectively). FIG. 3B is an example of gingiva edges 302 detected by the edge detection engine 178 from the 2D digital photograph of FIG. 3A.

Figure 3C:
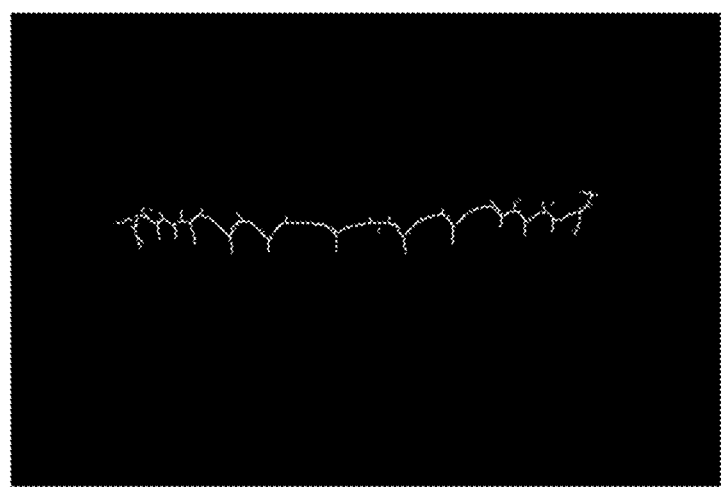

The noise reduction engine 180 may implement one or more automated agents configured to remove noise from or refine the edges detected by the edge detection engine 178. For example, the noise reduction engine 180 may implement a noise reduction algorithm or noise reduction machine learning algorithm to remove noise from or refine the edges detected by the edge detection engine 180. In some examples, the algorithm can be a local maximum algorithm. FIG. 3C is an example of modified gingiva edges 304 after applying the noise reduction algorithm with the noise reduction engine 180 to the gingiva edges 302 from FIG. 3B.

Figure 3D:
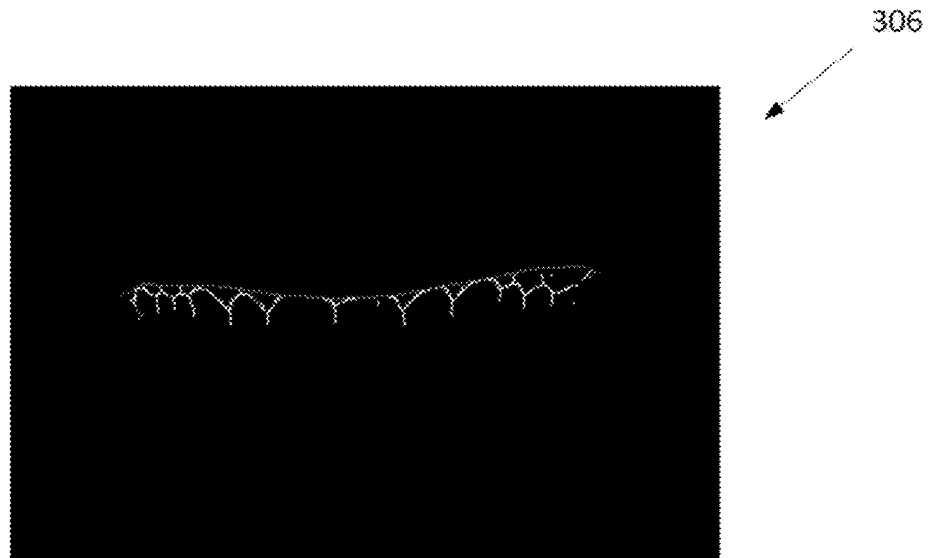
Figure 3E:
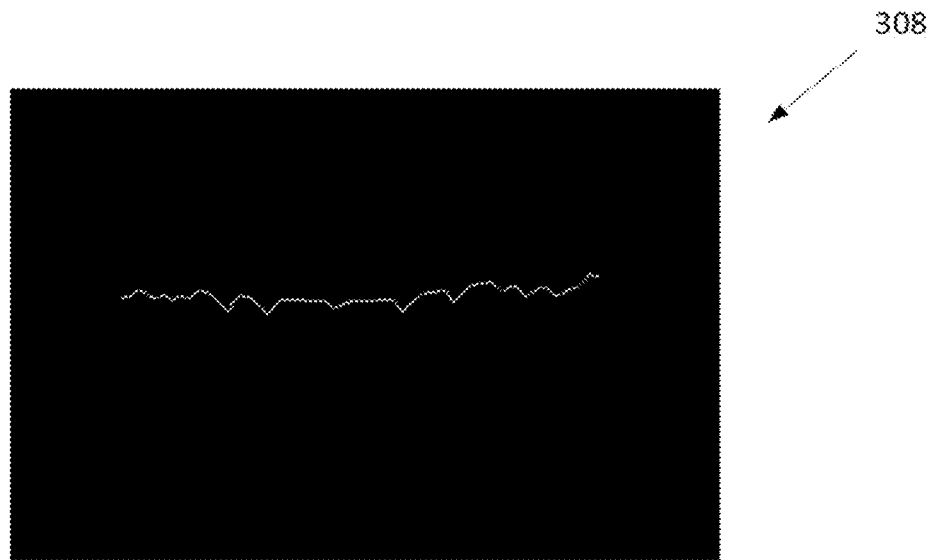

The edge combination engine 181 may implement one or more automated agents configured to combine or overlay edges detected by the edge detection engine 178 with edges detected by one of the other modules, such as the tooth processing engine(s) 162 or the lip processing engine(s) 166. The edge combination engine 181 may also implement one or more automated agents configured to calculate and output a section or portion of the combined or overlaid edges. For example, the edge combination engine 181 may overlay the gingiva edges detected by the gingiva processing engine(s) 164 with the lip edges detected by the lip processing engine(s) 166 to form combined gingiva and lip edges. The edge combination engine 181 may then implement an algorithm to the combined gingiva and lip edges, such as a shortest path algorithm, to calculate or determine a gingiva/lip line. FIG. 3D illustrates an example of combined 306 gingiva edges 304 and lip edges 404 (upper lip edge, e.g., from FIG. 4C) comprising the gingiva edges detected by the gingiva processing engine(s) 164 overlaid with the lip edges detected by the lip processing engine(s) 166. FIG. 3E is an example of gingiva/lip line 308 after applying a shortest path algorithm to the combined gingiva and lip edges 306 from FIG. 3D.

The gingiva edge datastore 182 may be configured to store data related to model dental arches from the edge detection engine 178, the noise reduction engine 180, or the edge combination engine 181. The model dental arch data may comprise gingiva edges, lip edges, gingiva/lip lines, or other combined or processed edge data from the other modules.

Figure 1D:
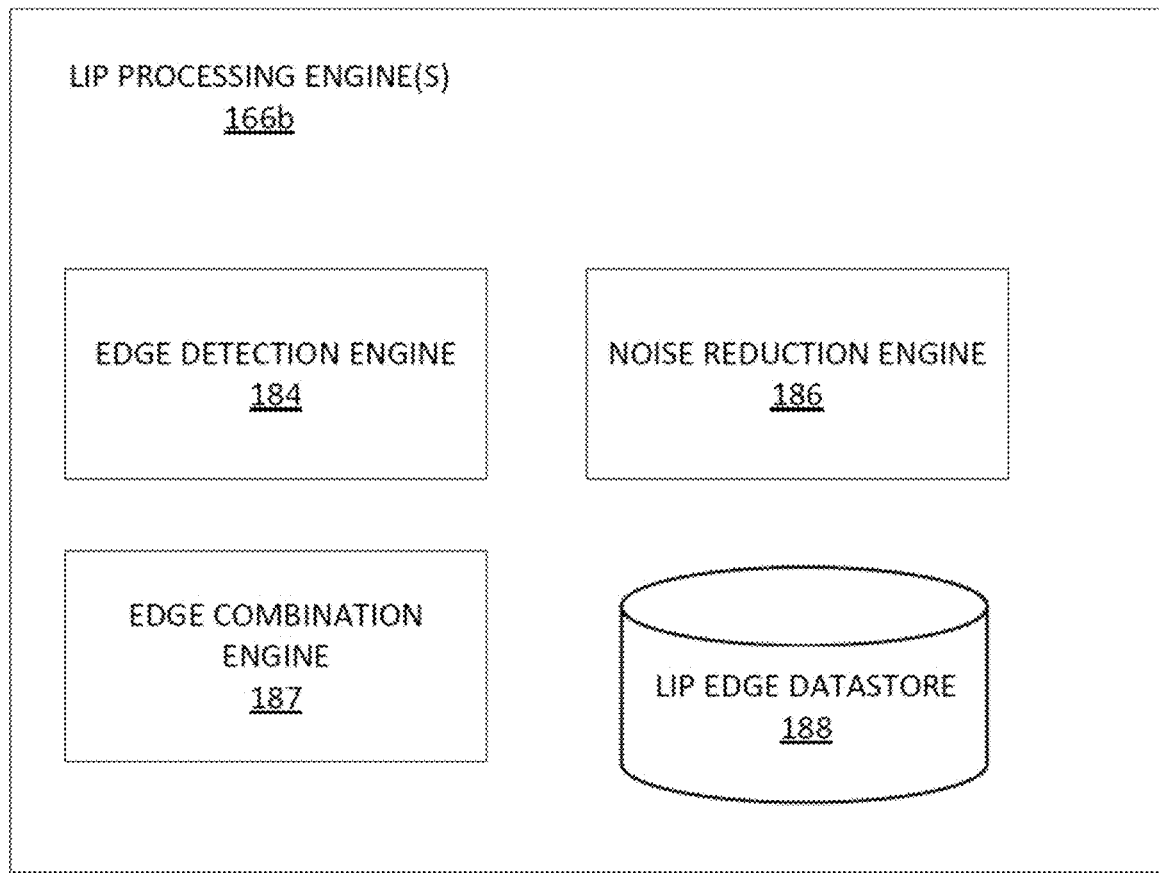
FIG. 1D is a diagram showing an example of a lip processing engine(s).

FIG. 1D is a diagram showing an example of the lip processing engine(s) 166b. The lip processing engine(s) 166b may include an edge detection engine 184, a noise reduction engine 186, an edge combination engine 187, and a lip edge datastore 188. One or more of the modules of the lip processing engine(s) 166b may be coupled to each other or to modules not shown.

Figure 4A:
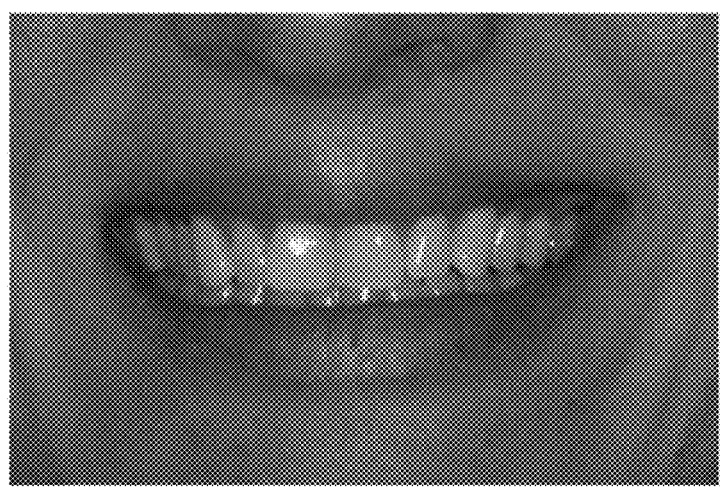
FIGS. 4A-4C illustrate an example of detecting and processing dental edges including lip edges.
Figure 4B:
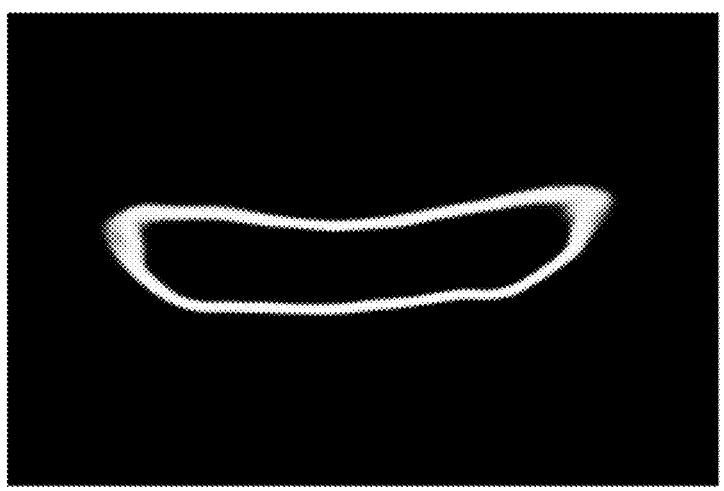

The edge detection engine 184 may implement one or more automated agents configured to scan a dental arch for segmentation data. The edge detection engine 184 may implement automated agents to detect lip edges in the dental arch. In some implementations, the edge detection engine 184 scans 2D (e.g., a photograph) or 3D (e.g., dental mesh model) data for the segmentation data. FIG. 4A is an example of a 2D digital photograph 400 of a person's dental arch that may be scanned by the edge detection engine 184. FIG. 4B is an example of lip edges 402 detected by the edge detection engine 184 from the 2D digital photograph of FIG. 4A.

Figure 4C:
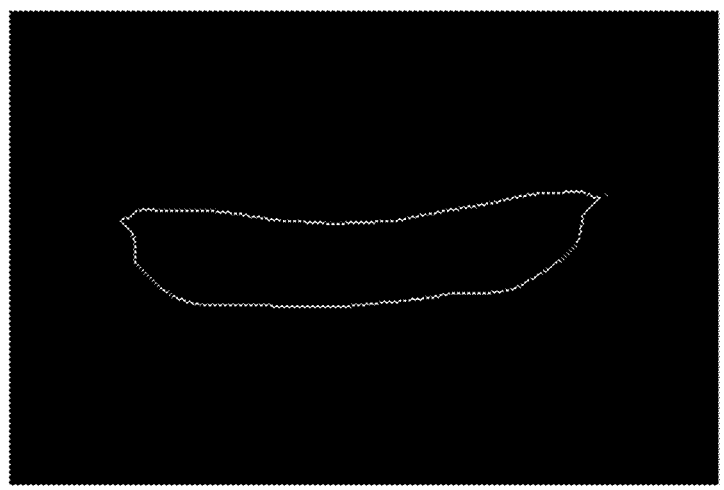

The noise reduction engine 186 may implement one or more automated agents configured to remove noise from or refine the edges detected by the edge detection engine 184. For example, the noise reduction engine 186 may implement a noise reduction algorithm or noise reduction machine learning algorithm to remove noise from or refine the edges detected by the edge detection engine 186. In some examples, the algorithm can be a thinning and/or shortest path algorithm. FIG. 4C is an example of modified lip edges 404 after applying the noise reduction algorithm with the noise reduction engine 186 to the lip edges 402 from FIG. 4B.

The edge combination engine 187 may implement one or more automated agents configured to combine or overlay edges detected by the edge detection engine 184 with edges detected by one of the other modules, such as the tooth processing engine(s) 162 or the gingiva processing engine(s) 164. The edge combination engine 187 may also implement one or more automated agents configured to calculate and output a section or portion of the combined or overlaid edges. For example, the edge combination engine 187 may overlay the tooth edges detected by the tooth processing engine(s) 162 with the lip edges detected by the lip processing engine(s) 166 to form combined tooth and lip edges, or may overlay the gingiva edges detected by the gingiva processing engine(s) 164 with the lip edges detected by the lip processing engine(s) 166 to form combined gingiva and lip edges. This implementation can be the same as described above with respect to the other modules and to FIGS. 2D and 3D. The edge combination engine 187 may then implement an algorithm to the combined tooth and lip edges, or to the combined gingiva and lip edges, such as a shortest path algorithm, to calculate or determine a tooth line and/or a gingiva/lip line. FIG. 2E illustrates an example of combined tooth and lip edges 206, comprising the tooth edges detected by the tooth processing engine(s) 162 overlaid with the lip edges detected by the lip processing engine(s) 166. FIG. 3D illustrates an example of combined gingiva and lip edges 306, comprising the gingiva edges detected by the gingiva processing engine(s) 164 overlaid with the lip edges detected by the lip processing engine(s) 166. FIG. 2F is an example of tooth line 208 after applying a shortest path algorithm to the combined tooth and lip edges 206 from FIG. 2E. FIG. 3E is an example of gingiva/lip line 308 after applying a shortest path algorithm to the combined gingiva and lip edges 306 from FIG. 3D.

The lip edge datastore 188 may be configured to store data related to model dental arches from the edge detection engine 184, the noise reduction engine 186, or the edge combination engine 187. The model dental arch data may comprise lip edges, tooth lines, gingiva/lip lines, or other combined or processed edge data from the other modules.

Figure 1E:
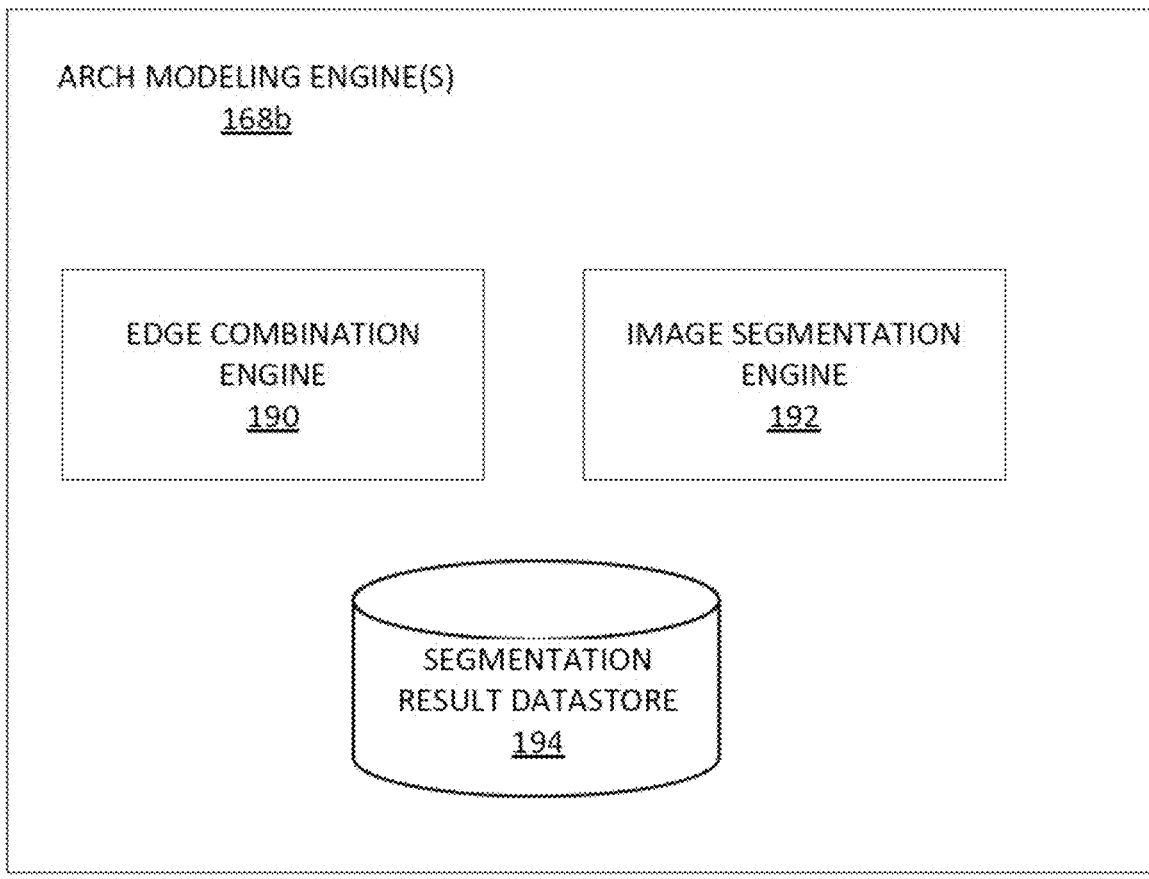
FIG. 1E is a diagram showing an example of an arch modeling engine(s).

FIG. 1E is a diagram showing an example of the arch modeling engine(s) 168*b*. The arch modeling engine(s) 168*b* may include an edge combination engine 190, an image segmentation engine 192, and a segmentation result datastore 194. One or more of the modules of the arch modeling engine(s) 168*b* may be coupled to each other or to modules not shown.

Figure 5A:
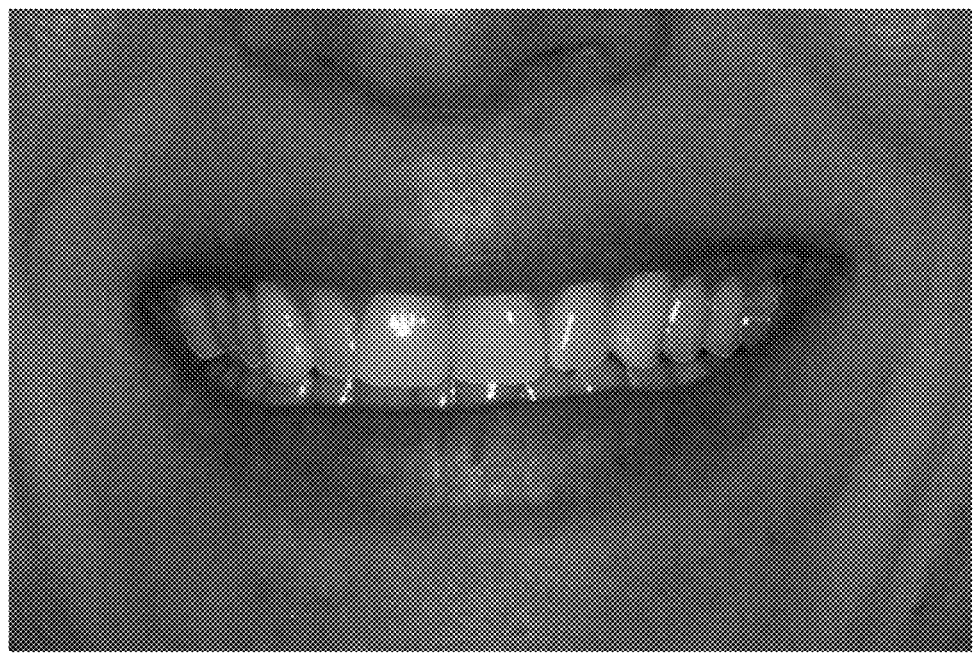
FIGS. 5A-5B illustrate an example of a region of interest (e.g., upper dental arch) for an example of segmentation.
Figure 5B:
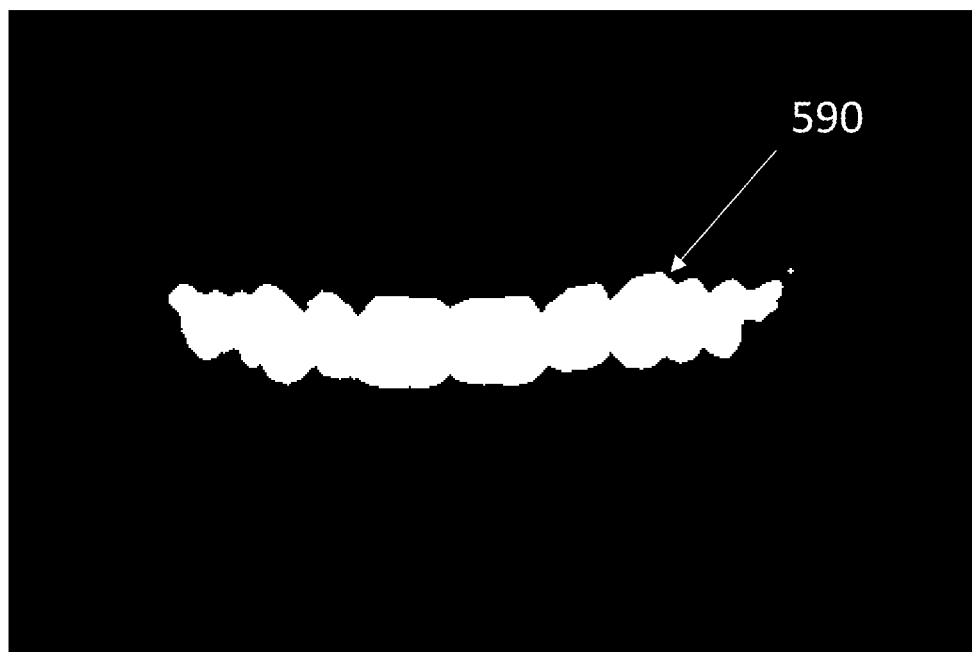

In any of the methods and apparatuses described herein, the region of interest may be limited to the upper dental arch (e.g., maxilla). More specifically, the region of interest 590 may be determined from the upper gingival line 308 (FIG. 3E) and the tooth line 208 (FIG. 2F), as shown in FIG. 5B. FIG. 5A (as in FIGS. 2A, 3A and 4A, shows the image of the person's face.

Figure 5C:
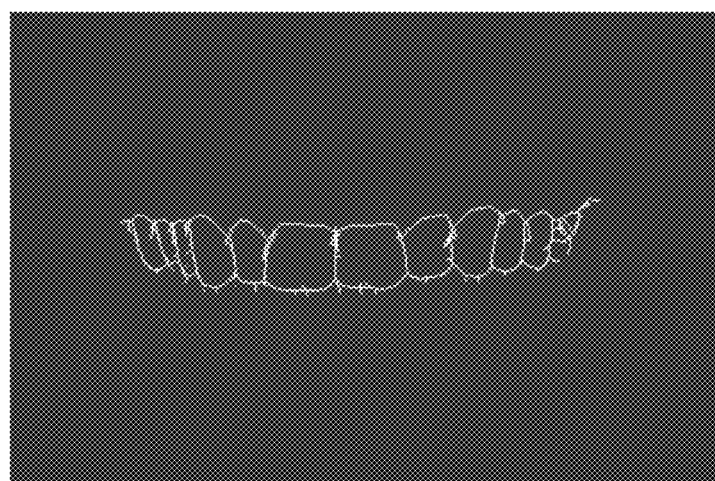
FIGS. 5C-5F illustrate an example of processing an initial segmentation result, an intermediate segmentation result, and a final segmentation result from the dental edges.

The edge combination engine 190 may implement one or more automated agents configured to combine or overlay edges from any of the other modules, such as the tooth processing engine(s) 162, the gingiva processing engine(s) 164, or the lip processing engine(s) 166. For example, the edge combination engine 190 can combine the tooth edges and tooth line from the tooth processing engine(s) 162 (e.g., tooth edges 204 and tooth line 208 from FIGS. 2D and 2F), and the gingiva/lip line from the gingiva processing engine(s) 164 or the lip processing engine(s) 166 (e.g., gingiva/lip line 308 from FIG. 3E) to form an initial segmentation result. FIG. 5C shows an example of an initial segmentation result 500 that combines or overlays the tooth edges 204 (FIG. 2D), tooth line 208 (FIG. 2F), and gingiva/lip line 308 (FIG. 3E).

Figure 5D:
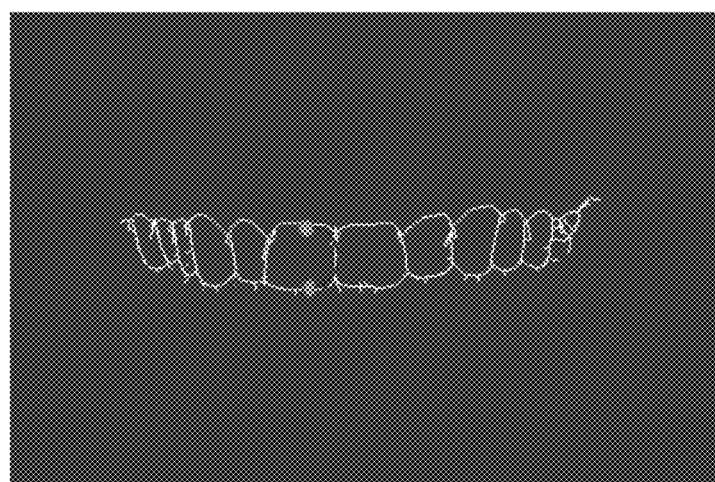
Figure 5E:
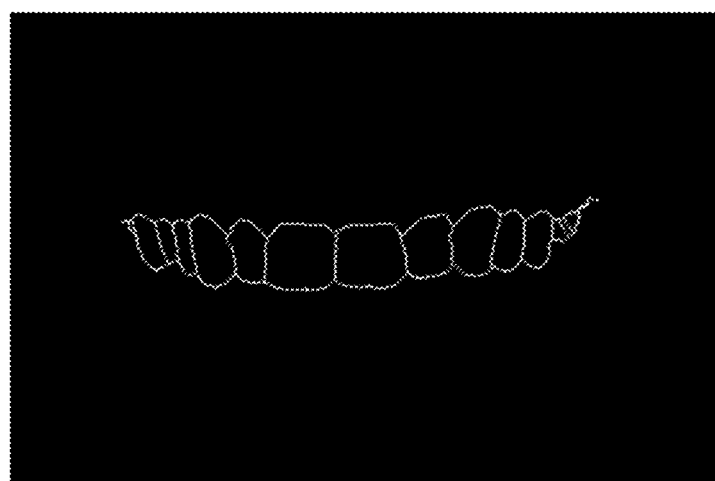

The image segmentation engine 192 may implement one or more automated agents configured to remove noise from or refine the initial segmentation result from the edge combination engine 190 to produce an intermediate segmentation result. For example, the image segmentation engine 192 may implement a noise reduction algorithm or noise reduction machine learning algorithm to remove noise from or refine the initial segmentation result from the edge combination engine 190. In some examples, the algorithm can be a shortest path algorithm. FIG. 5D is an example of a shortest past algorithm 502 being applied to the initial segmentation result 500 from FIG. 5C. The gingiva/lip line can be segmented into a series of start points, and for each start point, the algorithm can identify a corresponding end point on the tooth line and find the shortest path from the start point on the gingiva/lip line to the end point on the tooth line. The algorithm is repeated for each of the start and end points. The result is an intermediate segmentation result 506 shown in FIG. 5E.

Figure 5F:
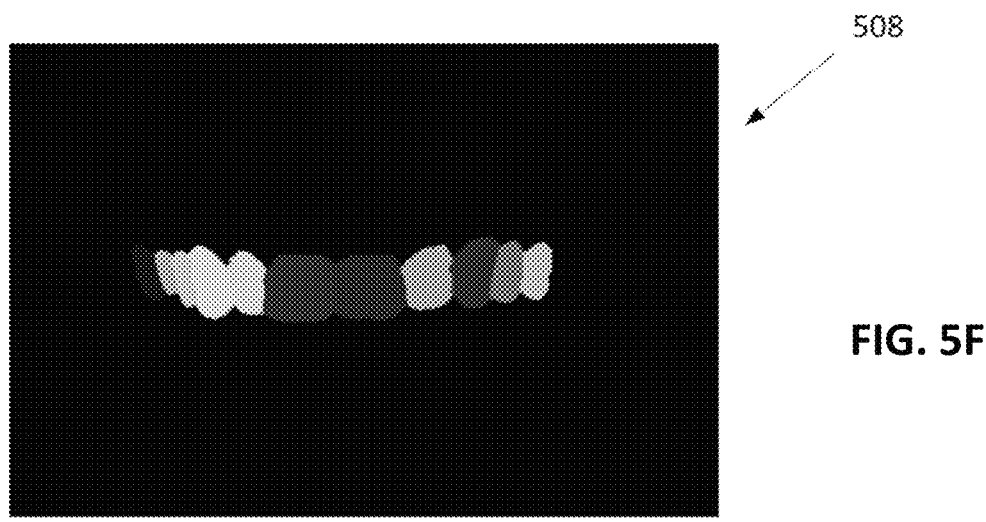

The image segmentation engine 192 may further implement one or more automated agents configured to remove noise from or refine the intermediate segmentation result to produce a final segmentation result. For example, the image segmentation engine 192 may implement a noise reduction algorithm or noise reduction machine learning algorithm to remove noise from or refine the intermediate segmentation result from. In some examples, the algorithm can be a region growing algorithm. The region growing algorithm can all closed regions in the intermediate segmentation result and perform region growing within the closed regions until all pixels are filled. Small regions below a region threshold can be removed to eliminate or reduce noise. The algorithm is repeated for each closed region. The result is a final segmentation result 508 shown in FIG. 5F.

FIG. 6 illustrates a flowchart 600 that describes an automated tooth segmentation process for properly segmenting teeth without human intervention. For example, flowchart 600 describes a process for segmenting a 2D digital photograph of a person's arch as shown in FIG. 2A. Referring to step 602 of flowchart 600, the process includes detecting dental edges including tooth edges, gingiva edges, and/or lip edges. This can be performed, for example, on a 2D image or a 3D dental mesh model of a person's dental arch.

Next, at step 604, the process optionally includes processing the detected edges from step 602 to reduce noise in the detected edges. The processing can be, for example, applying a noise reduction algorithm such as a local maximum, thinning, or shortest path algorithm. Examples of the result of this processing step are shown in FIGS. 2D, 3C, and 4C, as described above.

Next, at step 606, the process includes combining the detected edges from either step 602 or step 604 to produce a tooth line and/or a gingiva/lip line. The combining can be, for example, applying an algorithm such as shortest path to produce the tooth line and/or the gingiva/lip line from the tooth edges, gingiva edges, and/or lip edges. Examples of the result of this processing step are shown in FIGS. 2F and 3E, as described above.

Next, at step 608, the process includes combining the tooth line, tooth edges, and gingiva/lip line to form an initial segmentation result. An example of an initial segmentation result is shown in FIG. 5C, as described above.

At step 610, the process includes applying noise reduction to the initial segmentation result to form a final segmentation result. The applying can be, for example, applying an algorithm such as shortest path algorithm to reduce noise in the initial segmentation result, and/or further applying region growing within closed regions in the initial segmentation result to remove noise and closed regions smaller than a region threshold.

Figure 7:
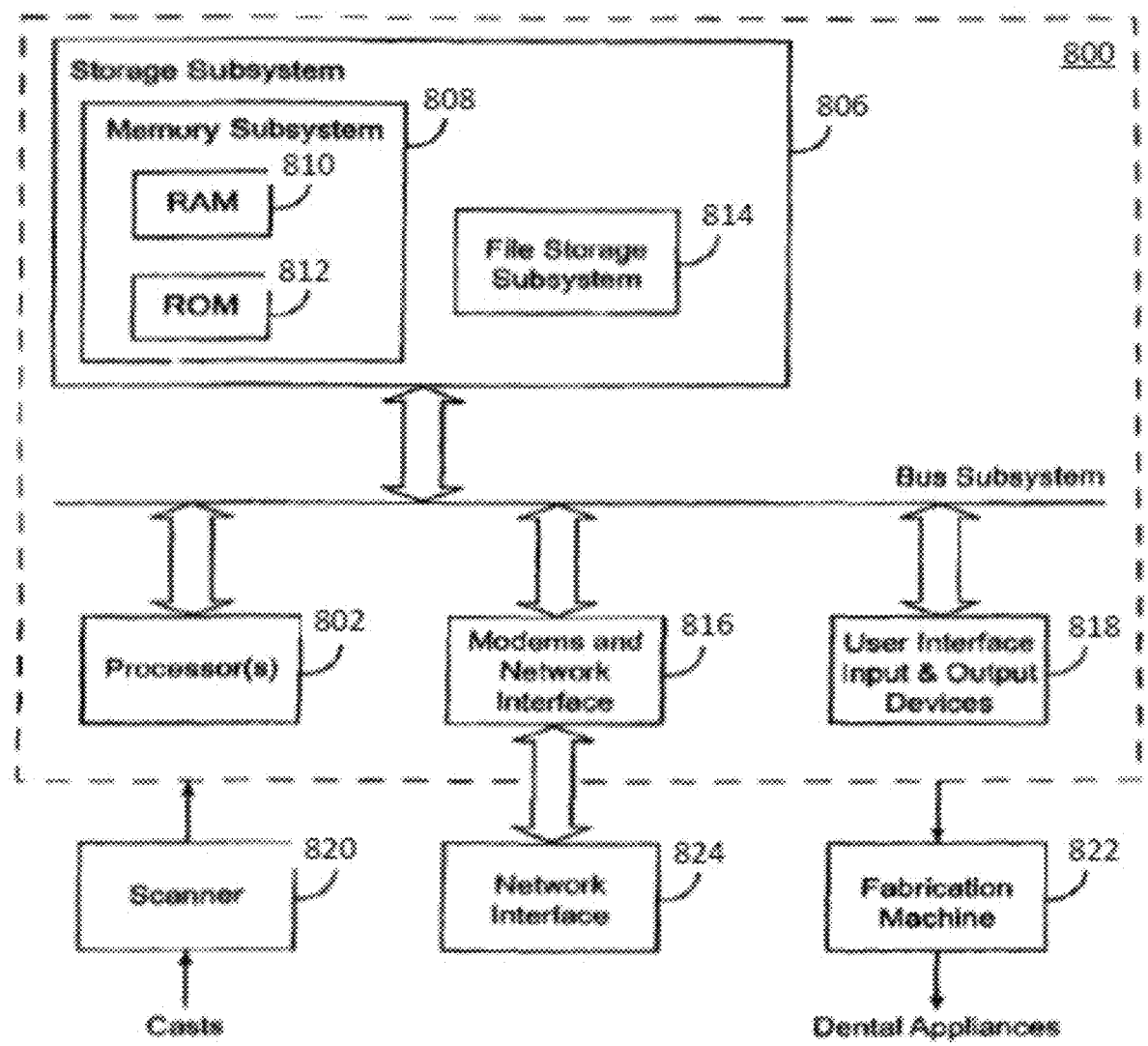
FIG. 7 is a simplified block diagram showing an example of a data processing system for designing and manufacturing an orthodontic aligner.

The methods described herein may be performed by an apparatus, such as a data processing system, which may include hardware, software, and/or firmware for performing many of these steps described above. For example, FIG. 7 is a simplified block diagram of a data processing system 800. Data processing system 800 typically includes at least one processor 802 which communicates with a number of peripheral devices over bus subsystem 804. These peripheral devices typically include a storage subsystem 806 (memory subsystem 808 and file storage subsystem 814), a set of user interface input and output devices 818, and an interface to outside networks 816, including the public switched telephone network. This interface is shown schematically as "Modems and Network Interface" block 816, and is coupled to corresponding interface devices in other data processing systems over communication network interface 824. Data processing system 800 may include a terminal or a low-end personal computer or a high-end personal computer, workstation or mainframe.

The user interface input devices typically include a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, may be used.

User interface output devices may include a printer and a display subsystem, which includes a display controller and a display device coupled to the controller. The display device may be a cathode ray tube (CRT), a flat-panel device such as a liquid crystal display (LCD), or a projection device. The display subsystem may also provide nonvisual display such as audio output.

Storage subsystem 806 maintains the basic programming and data constructs that provide the functionality of the present invention. The software modules discussed above are typically stored in storage subsystem 806. Storage subsystem 806 typically comprises memory subsystem 808 and file storage subsystem 814.

Memory subsystem 808 typically includes a number of memories including a main random access memory (RAM) 810 for storage of instructions and data during program execution and a read only memory (ROM) 812 in which fixed instructions are stored. In the case of Macintosh-compatible personal computers the ROM would include portions of the operating system; in the case of IBM-compatible personal computers, this would include the BIOS (basic input/output system).

File storage subsystem 814 provides persistent (nonvolatile) storage for program and data files, and typically includes at least one hard disk drive and at least one floppy disk drive (with associated removable media). There may also be other devices such as a CD-ROM drive and optical drives (all with their associated removable media). Additionally, the system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected over various local-area or wide-area network media, including telephone lines. Similarly, the input devices and display need not be at the same location as the processor, although it is anticipated that the present invention will most often be implemented in the context of PCS and workstations.

Bus subsystem 804 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

Scanner 820 is responsible for scanning casts of the person's teeth obtained either from the person or from an orthodontist and providing the scanned digital data set information to data processing system 800 for further processing. In a distributed environment, scanner 820 may be located at a remote location and communicate scanned digital data set information to data processing system 800 over network interface 824.

Fabrication machine 822 fabricates dental appliances based on intermediate and final data set information received from data processing system 800. In a distributed environment, fabrication machine 822 may be located at a remote location and receive data set information from data processing system 800 over network interface 824.

The dental appliance fabricated by the fabrication machine 822 can be designed to implement at least a portion of a treatment plan, comprising a shell having a plurality of cavities therein designed to receive teeth of a jaw.

In another embodiment, the system 800 of FIG. 7 can include a non-transitory computing device readable medium having instructions stored thereon that are executable by a processor to cause a computing device to receive, via a computing device, data representing a plurality of teeth and generate a series of incremental tooth arrangements to define a proposed dental treatment.

Various alternatives, modifications, and equivalents may be used in lieu of the above components. Although the final position of the teeth may be determined using computer-aided techniques, a user may move the teeth into their final positions by independently manipulating one or more teeth while satisfying the constraints of the prescription.

Additionally, the techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program can be implemented in a high level procedural or object-oriented programming language to operate in conjunction with a computer system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 8:
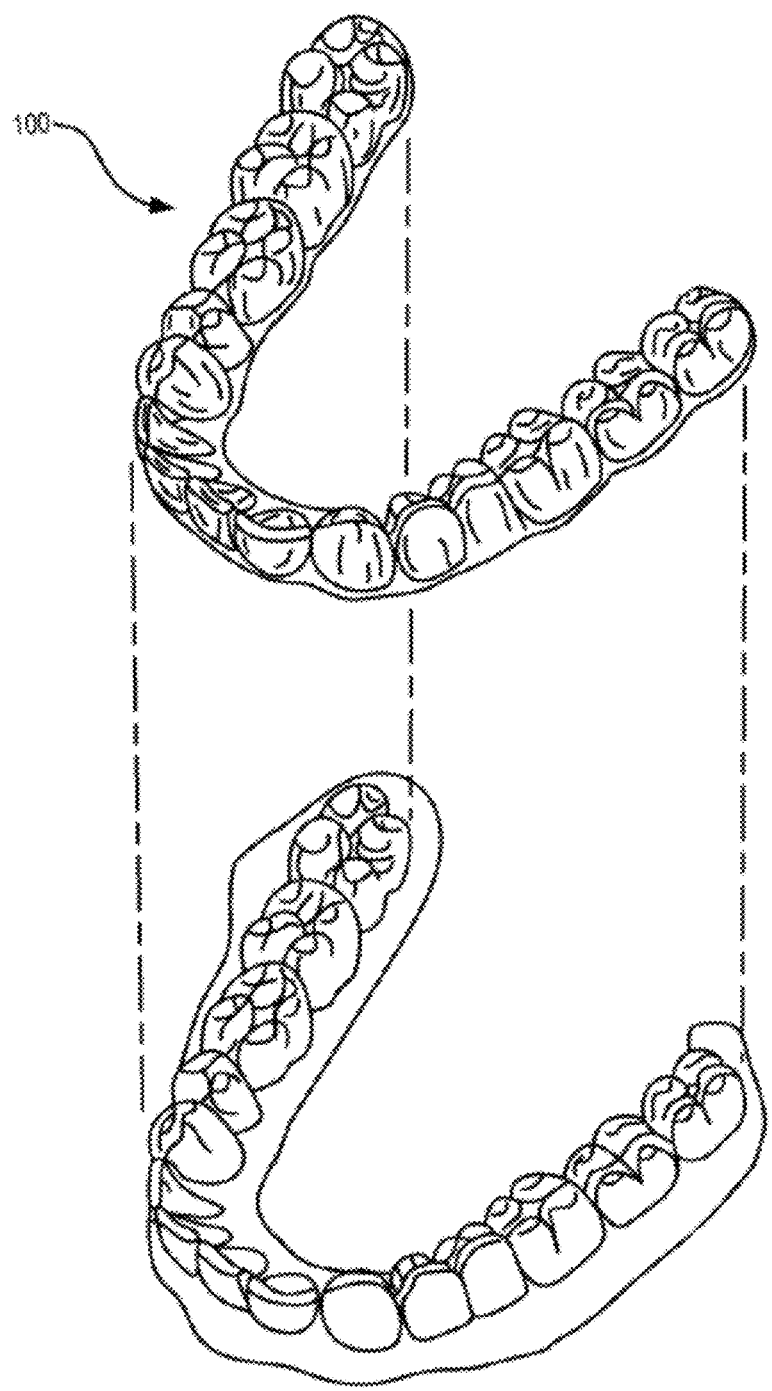
FIG. 8 shows an example of an orthodontic aligner.

FIG. 8 shows an orthodontic aligner 100, which can be used with the methods and apparatuses (including modified by) described above.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of segmenting teeth in a two-dimensional (2D) representation of a face, the method comprising:
   receiving the 2D representation, wherein the 2D representation shows a portion of the teeth, first soft tissue in the face, and second soft tissue in the face;
   detecting a plurality of anatomical edges in the 2D representation separating the teeth, the first soft tissue, and the second soft tissue from one another;
   generating, from the plurality of anatomical edges, a soft tissue line separating the first soft tissue from the second soft tissue;
   generating, from the plurality of anatomical edges, a tooth line defining a visible edge of the teeth; and
   forming a segmented tooth model from the 2D representation using the soft tissue line and the tooth line.

2. The method of claim 1, wherein forming the segmented tooth model comprises evaluating intensity values of pixels along the tooth line.

3. The method of claim 1, wherein detecting the plurality of anatomical edges comprises performing nested edge detection on the 2D representation.

4. The method of claim 1, wherein detecting the plurality of anatomical edges comprises performing holistic edge detection on the 2D representation.

5. The method of claim 1, wherein detecting the plurality of anatomical edges comprises using a machine-learning system to recognize the plurality of anatomical edges on the 2D representation.

6. The method of claim 1, wherein detecting the plurality of anatomical edges comprises performing nested edge detection to detect and analyze gingival edges in a dental arch.

7. The method of claim 1, further comprising:
   forming an intermediate segmentation using the soft tissue line and the tooth line;
   removing noise from the intermediate segmentation to produce a final segmentation result; and
   forming the segmented tooth model using the final segmentation result.

8. The method of claim 1, further comprising:
   forming an intermediate segmentation using the soft tissue line and the tooth line;
   removing noise from the intermediate segmentation to produce a final segmentation result; and
   form the segmented tooth model using the final segmentation result;
   wherein removing noise from the intermediate segmentation comprises: defining a set of closed regions; and performing region growing for the set of closed regions until all pixels in the set of closed regions are filled.

9. The method of claim 1, wherein forming the segmented tooth model comprises:
   segmenting the soft tissue line into a series of start points;
   for each start point of the series of start points, identifying a corresponding end point on the tooth line; and
   finding a shortest path from each start point to the corresponding end point on the tooth line, wherein the shortest path comprises a minimum distance between the start point and the corresponding end point.

10. The method of claim 1, wherein generating the tooth line comprises overlaying the plurality of anatomical edges in relation to one another to form combined anatomical edges.

11. The method of claim 1, further comprising reducing noise from the plurality of anatomical edges before generating the tooth line.

12. The method of claim 1, further comprising reducing noise from the plurality of anatomical edges before generating the soft tissue line.

13. The method of claim 1, further comprising determining one or more local maxima along the plurality of anatomical edges to reduce noise from the plurality of anatomical edges.

14. The method of claim 1, wherein the first soft tissue comprises lips, the second soft tissue comprises gingiva, or some combination thereof.

15. The method of claim 1, wherein the 2D representation comprises an image captured on a mobile device or a camera.

16. The method of claim 1, further comprising using the segmented tooth model to simulate an effect of a restorative treatment plan.

17. The method of claim 1, further comprising using the segmented tooth model to simulate an effect of an orthodontic treatment plan.

18. The method of claim 1, further comprising displaying segmented teeth on the 2D representation using the segmented tooth model.

19. The method of claim 1, further comprising generating a simulated image of the face, wherein a region between lip line(s) of the face in the simulated image shows a simulated effect of an orthodontic treatment plan using the segmented tooth model.

20. A system comprising:
one or more processors;
memory storing computer-program instructions that, when executed by the one or more processors, cause the system to perform a computer-implemented method comprising;
receiving a 2D representation of a face including teeth and soft tissue, wherein the 2D representation shows a portion of the teeth, a first soft tissue in the face, and a second soft tissue in the face;
detecting a plurality of anatomical edges in the 2D representation separating the teeth, the first soft tissue, and the second soft tissue from one another;
generating, from the plurality of anatomical edges, a soft tissue line separating the first soft tissue from the second soft tissue;
generating, from the plurality of anatomical edges, a tooth line defining a visible edge of the teeth; and
forming a segmented tooth model from the 2D representation using the soft tissue line and the tooth line.

* * * * *